United States Patent
Zubrin et al.

(10) Patent No.: US 7,624,801 B2
(45) Date of Patent: Dec. 1, 2009

(54) CONTROL SYSTEM AND METHOD FOR CONTROLLING A HYBRID PETROLEUM EXTRACTOR/POWER GENERATOR

(75) Inventors: Robert M. Zubrin, Indian Hills, CO (US); Mark H. Berggren, Golden, CO (US); Douwe Bruinsma, Lakewood, CO (US)

(73) Assignee: Pioneer Energy Inc., Lakewood, CO (US)

( * ) Notice: Subject to any disclaimer, the term of this patent is extended or adjusted under 35 U.S.C. 154(b) by 0 days.

(21) Appl. No.: 12/165,568

(22) Filed: Jun. 30, 2008

(65) Prior Publication Data

US 2009/0008089 A1     Jan. 8, 2009

(51) Int. Cl.
*E21B 47/06* (2006.01)
(52) U.S. Cl. .............. 166/250.15; 166/250.07; 166/268; 166/402
(58) Field of Classification Search ............ 166/250.15, 166/250.07, 268, 402
See application file for complete search history.

(56) References Cited

U.S. PATENT DOCUMENTS

| | | | | |
|---|---|---|---|---|
| 3,480,082 A | * | 11/1969 | Gilliland | 166/266 |
| 4,250,230 A | * | 2/1981 | Terry | 429/12 |
| 6,505,467 B1 | * | 1/2003 | Fjellhaug et al. | 60/780 |
| 7,040,390 B2 | * | 5/2006 | Tubel et al. | 166/64 |
| 2006/0054318 A1 | * | 3/2006 | Sarada | 166/266 |
| 2006/0213657 A1 | * | 9/2006 | Berchenko et al. | 166/245 |

* cited by examiner

*Primary Examiner*—Jennifer H Gay
*Assistant Examiner*—Brad Harcourt
(74) *Attorney, Agent, or Firm*—American Pioneer Ventures; Daniar Hussain

(57) ABSTRACT

A control system and control method for controlling a modular apparatus for extracting petroleum and/or generating electricity based on subsurface data as well as market prices of electricity and/or petroleum. One or more probes measure subsurface total pressure, partial pressure of carbon dioxide, partial pressure of hydrogen, oil flow rate, gas flow rate, underground temperature, and/or viscosity of the oil. The control system/method controls the apparatus based on the subsurface parameters by controlling an injection module and/or a gas separator module to increase or decrease output of driver gas. The control system/method may also control the injection module and/or the gas separator module to increase (or decrease) output of driver gas when the market price of electricity decreases (or increases) and/or petroleum increases (or decreases).

18 Claims, 17 Drawing Sheets

250 kcf CO₂ per day

| Reformer Feed | Heater Feed | H₂ Injected into Well ||||||| H₂ for Electricity ||||
| | | H₂ as effective as CO₂ ||| H₂ is 0.5 times CO₂ ||| H₂ is 2 times CO₂ ||| | | | |
| | | Total Cost ($) | Total Value ($) | Multiplier | Total Cost ($) | Total Value ($) | Multiplier | Total Cost ($) | Total Value ($) | Multiplier | Electric Output (kW) | Total Cost ($) | Total Value ($) | Multiplier |
|---|---|---|---|---|---|---|---|---|---|---|---|---|---|---|
| Coal | Coal | 1,459 | 5,178 | 3.55 | 1,459 | 3,678 | 2.52 | 1,459 | 8,178 | 5.61 | 572 | 1,596 | 3,551 | 2.22 |
| Coal | Local oil | 1,953 | 5,001 | 2.56 | 1,953 | 3,501 | 1.79 | 1,953 | 8,001 | 4.10 | 572 | 2,090 | 3,374 | 1.61 |
| Coal | Methane | 1,755 | 4,893 | 2.79 | 1,755 | 3,393 | 1.93 | 1,755 | 7,893 | 4.50 | 572 | 1,892 | 3,265 | 1.73 |
| Coal | Propane | 2,004 | 4,893 | 2.44 | 2,004 | 3,393 | 1.69 | 2,004 | 7,893 | 3.94 | 572 | 2,141 | 3,265 | 1.53 |
| Methane | Coal | 2,981 | 8,437 | 2.83 | 2,981 | 5,437 | 1.82 | 2,981 | 14,437 | 4.84 | 1,144 | 3,118 | 5,182 | 1.66 |
| Methane | Local oil | 3,253 | 8,193 | 2.52 | 3,253 | 5,193 | 1.60 | 3,253 | 14,193 | 4.36 | 1,144 | 3,390 | 4,939 | 1.46 |
| Methane | Methane | 2,979 | 8,043 | 2.70 | 2,979 | 5,043 | 1.69 | 2,979 | 14,043 | 4.71 | 1,144 | 3,116 | 4,788 | 1.54 |
| Methane | Propane | 3,324 | 8,043 | 2.42 | 3,324 | 5,043 | 1.52 | 3,324 | 14,043 | 4.22 | 1,144 | 3,461 | 4,788 | 1.38 |
| Propane | Coal | 3,634 | 6,970 | 1.92 | 3,634 | 4,470 | 1.23 | 3,634 | 11,970 | 3.29 | 953 | 3,771 | 4,258 | 1.13 |
| Propane | Local oil | 3,565 | 6,847 | 1.92 | 3,565 | 4,347 | 1.22 | 3,565 | 11,847 | 3.32 | 953 | 3,702 | 4,135 | 1.12 |
| Propane | Methane | 3,428 | 6,772 | 1.98 | 3,428 | 4,272 | 1.25 | 3,428 | 11,772 | 3.43 | 953 | 3,565 | 4,060 | 1.14 |
| Propane | Propane | 3,601 | 6,772 | 1.88 | 3,601 | 4,272 | 1.19 | 3,601 | 11,772 | 3.27 | 953 | 3,738 | 4,060 | 1.09 |
| Local oil | Coal | 3,307 | 6,946 | 2.10 | 3,307 | 4,621 | 1.40 | 3,307 | 11,596 | 3.51 | 887 | 3,444 | 4,424 | 1.28 |
| Local oil | Local oil | 3,476 | 6,739 | 1.94 | 3,476 | 4,414 | 1.27 | 3,476 | 11,389 | 3.28 | 887 | 3,613 | 4,217 | 1.17 |
| Local oil | Methane | 3,243 | 6,611 | 2.04 | 3,243 | 4,286 | 1.32 | 3,243 | 11,261 | 3.47 | 887 | 3,380 | 4,089 | 1.21 |
| Local oil | Propane | 3,536 | 6,611 | 1.87 | 3,536 | 4,286 | 1.21 | 3,536 | 11,261 | 3.18 | 887 | 3,673 | 4,089 | 1.11 |
| Methanol | Coal | 6,589 | 4,749 | 0.72 | 6,589 | 3,249 | 0.49 | 6,589 | 7,749 | 1.18 | 572 | 6,726 | 3,122 | 0.46 |
| Methanol | Local oil | 6,360 | 4,684 | 0.74 | 6,360 | 3,184 | 0.50 | 6,360 | 7,684 | 1.21 | 572 | 6,497 | 3,057 | 0.47 |
| Methanol | Methane | 6,287 | 4,644 | 0.74 | 6,287 | 3,144 | 0.50 | 6,287 | 7,644 | 1.22 | 572 | 6,424 | 3,017 | 0.47 |
| Methanol | Propane | 6,379 | 4,644 | 0.73 | 6,379 | 3,144 | 0.49 | 6,379 | 7,644 | 1.20 | 572 | 6,516 | 3,017 | 0.46 |
| Methanol | Methanol | 6,701 | 4,654 | 0.69 | 6,701 | 3,154 | 0.47 | 6,701 | 7,654 | 1.14 | 572 | 6,838 | 3,027 | 0.44 |

Fig 15.

1,000 kcf CO₂ per day

| Reformer Feed | Heater Feed | H₂ Injected into Well | | | | | | | | | | | H₂ for Electricity | | | |
|---|---|---|---|---|---|---|---|---|---|---|---|---|---|---|---|---|
| | | H₂ as effective as CO₂ | | | H₂ is 0.5 times CO₂ | | | | H₂ is 2 times CO₂ | | | | Electric Output (kW) | Total Cost ($) | Total Value ($) | Multiplier |
| | | Total Cost ($) | Total Value ($) | Multiplier | Total Cost ($) | Total Value ($) | Multiplier | | Total Cost ($) | Total Value ($) | Multiplier | | | | | |
| Coal | Coal | 2,137 | 20,711 | 9.69 | 2,137 | 14,711 | 6.88 | | 2,137 | 32,711 | 15.31 | | 2,288 | 2,274 | 14,202 | 6.25 |
| Coal | Local oil | 4,113 | 20,005 | 4.86 | 4,113 | 14,005 | 3.41 | | 4,113 | 32,005 | 7.78 | | 2,288 | 4,250 | 13,497 | 3.18 |
| Coal | Methane | 3,321 | 19,570 | 5.89 | 3,321 | 13,570 | 4.09 | | 3,321 | 31,570 | 9.51 | | 2,288 | 3,458 | 13,062 | 3.78 |
| Coal | Propane | 4,318 | 19,571 | 4.53 | 4,318 | 13,571 | 3.14 | | 4,318 | 31,571 | 7.31 | | 2,288 | 4,455 | 13,062 | 2.93 |
| Methane | Coal | 8,225 | 33,746 | 4.10 | 8,225 | 21,746 | 2.64 | | 8,225 | 57,746 | 7.02 | | 4,576 | 8,362 | 20,729 | 2.48 |
| Methane | Local oil | 10,545 | 32,772 | 3.11 | 10,545 | 20,772 | 1.97 | | 10,545 | 56,772 | 5.38 | | 4,576 | 10,682 | 19,754 | 1.85 |
| Methane | Methane | 9,451 | 32,170 | 3.40 | 9,451 | 20,170 | 2.13 | | 9,451 | 56,170 | 5.94 | | 4,576 | 9,588 | 19,153 | 2.00 |
| Methane | Propane | 10,829 | 32,171 | 2.97 | 10,829 | 20,171 | 1.86 | | 10,829 | 56,171 | 5.19 | | 4,576 | 10,966 | 19,153 | 1.75 |
| Propane | Coal | 10,837 | 27,878 | 2.57 | 10,837 | 17,878 | 1.65 | | 10,837 | 47,878 | 4.42 | | 3,813 | 10,974 | 17,030 | 1.55 |
| Propane | Local oil | 11,795 | 27,390 | 2.32 | 11,795 | 17,390 | 1.47 | | 11,795 | 47,390 | 4.02 | | 3,813 | 11,932 | 16,542 | 1.39 |
| Propane | Methane | 11,246 | 27,088 | 2.41 | 11,246 | 17,088 | 1.52 | | 11,246 | 47,088 | 4.19 | | 3,813 | 11,383 | 16,240 | 1.43 |
| Propane | Propane | 11,937 | 27,088 | 2.27 | 11,937 | 17,088 | 1.43 | | 11,937 | 47,088 | 3.94 | | 3,813 | 12,074 | 16,241 | 1.35 |
| Local oil | Coal | 9,527 | 27,784 | 2.92 | 9,527 | 18,484 | 1.94 | | 9,527 | 46,384 | 4.87 | | 3,547 | 9,664 | 17,696 | 1.83 |
| Local oil | Local oil | 11,438 | 26,956 | 2.36 | 11,438 | 17,656 | 1.54 | | 11,438 | 45,556 | 3.98 | | 3,547 | 11,575 | 16,867 | 1.46 |
| Local oil | Methane | 10,508 | 26,445 | 2.52 | 10,508 | 17,145 | 1.63 | | 10,508 | 45,045 | 4.29 | | 3,547 | 10,645 | 16,356 | 1.54 |
| Local oil | Propane | 11,679 | 26,445 | 2.26 | 11,679 | 17,145 | 1.47 | | 11,679 | 45,045 | 3.86 | | 3,547 | 11,816 | 16,357 | 1.38 |
| Methanol | Coal | 22,657 | 18,997 | 0.84 | 22,657 | 12,997 | 0.57 | | 22,657 | 30,997 | 1.37 | | 2,288 | 22,794 | 12,489 | 0.55 |
| Methanol | Local oil | 22,973 | 18,738 | 0.82 | 22,973 | 12,738 | 0.55 | | 22,973 | 30,738 | 1.34 | | 2,288 | 23,110 | 12,229 | 0.53 |
| Methanol | Methane | 22,682 | 18,578 | 0.82 | 22,682 | 12,578 | 0.55 | | 22,682 | 30,578 | 1.35 | | 2,288 | 22,819 | 12,069 | 0.53 |
| Methanol | Propane | 23,049 | 18,578 | 0.81 | 23,049 | 12,578 | 0.55 | | 23,049 | 30,578 | 1.33 | | 2,288 | 23,186 | 12,069 | 0.52 |
| Methanol | Methanol | 24,338 | 18,618 | 0.76 | 24,338 | 12,618 | 0.52 | | 24,338 | 30,618 | 1.26 | | 2,288 | 24,475 | 12,109 | 0.49 |

Fig 16.

CONTROL SYSTEM AND METHOD FOR CONTROLLING A HYBRID PETROLEUM EXTRACTOR/POWER GENERATOR

REFERENCE TO RELATED APPLICATIONS

This application claims priority from co-pending U.S. application Ser. No. 11/751,028 entitled "PORTABLE AND MODULAR SYSTEM FOR EXTRACTING PETROLEUM AND GENERATING POWER" to Robert Zubrin et al., filed on May 20, 2007, the entirety of which is hereby incorporated by reference herein.

FIELD OF THE INVENTION

This invention relates to a control system and a control method for an oil extracting/electricity generating apparatus. More particularly, the present invention relates to a control system and a control method for a portable and modular system/apparatus used to extract oil and/or generate electricity.

BACKGROUND OF THE INVENTION

Currently there are tens of thousands of depleted oil and natural gas wells around the world, which collectively possess significant amounts of petroleum resources that cannot currently be extracted using conventional extraction techniques.

For example, in a typical oil well, only about 30% of the underground oil is recovered during initial drilling ("primary recovery"). An additional approximately 20% of the original oil may be accessed by "secondary recovery" techniques such as water flooding. In recent years, "tertiary recovery" (also known as "Enhanced Oil Recovery" or EOR) techniques have been developed to recover additional oil from depleted wells. Such tertiary recovery techniques include thermal recovery, chemical injection, and gas injection. Using current methods, these tertiary techniques allow for an additional 20% or more of the original oil to be recovered.

Gas injection is one of the most common EOR techniques. In particular, carbon dioxide ($CO_2$) injection into depleted oil wells has received considerable attention owing to its ability to mix with crude oil. Since crude oil is miscible with $CO_2$ at moderate pressures and temperatures, injection of $CO_2$ renders the oil substantially less viscous and more amenable to recovery.

Despite the potential advantages of $CO_2$ in enhanced oil recovery, its use has been hampered by several factors. For instance, in order for the enhanced recovery process to be economically viable, the $CO_2$ gas must be available in copious supplies at reasonable cost at the site of the oil well. Alternatively, $CO_2$ can be produced from industrial applications such as natural gas processing, fertilizer, ethanol and hydrogen plants where naturally occurring $CO_2$ reservoirs are not available. The $CO_2$ must then be transported over large distances via pipelines and injected at the well site. Unfortunately, such $CO_2$ pipelines are difficult and costly to construct. Additionally, many oil sites are out of reach from such natural and industrial sources of $CO_2$.

Additionally, as a result of widespread concern over global warming, proposals are being considered to create taxes on $CO_2$ emissions, with typical figures in the range of $50 per tonne of $CO_2$ released into the atmosphere. However, most electric power plants, which burn coal or natural gas to generate electricity, produce large quantities of $CO_2$ waste product. Using present technologies, it is often not economically feasible to utilize the $CO_2$ from such power plants for oil recovery because they are not within close reach of oil fields. Thus, the cost of sequestering $CO_2$ in the ground is often not economically feasible.

In addition to $CO_2$, another gas that can potentially be used for enhanced oil recovery is hydrogen ($H_2$). Hydrogen gas has received considerably less attention than $CO_2$, however. Hydrogen, although somewhat soluble with oil, is far less so than $CO_2$. Large quantities of hydrogen are believed to be necessary for pressurization and long residence times are believe necessary for in-situ hydrogenation. Traditionally, hydrogen has been costly to produce and its use has not been justified from an economic standpoint.

As recognized by the present inventors and described in related patent applications, what is needed is a portable and modular system and apparatus that may be taken wherever a candidate oil field may be, for extracting oil/petroleum from the ground or from oil wells, such as "depleted" oil wells and for generating electricity without harmful greenhouse gas emissions.

However, as recognized by the present inventors, what are also needed are control methods and control systems for controlling the portable/modular oil extracting/power generating apparatus based on such factors as subsurface data, and market prices of crude oil and electricity. What is needed is an automatic control system and method for automatically controlling the oil extracting apparatus with minimum human supervision.

Therefore, it would be an advancement in the state of the art to provide a control system and a control method for a portable/modular apparatus that automatically controls the apparatus to generate carbon dioxide for enhanced oil recovery and to generate electricity from hydrogen.

It is against this background that various embodiments of the present invention were developed.

BRIEF SUMMARY OF THE INVENTION

The present invention is related to a control system and control method for a portable/modular apparatus for generating a gas mixture that may be used to drive currently unrecoverable oil from a near-depleted, or depleted, oil reservoir. An embodiment of the present invention may be applied to a portable $CO_2$ generation system, which also generates large supplies of hydrogen. The hydrogen gas may be injected into the oil well, either separately or in combination with the $CO_2$ gas. The hydrogen gas may also be used to generate power in the form of electricity.

A control system and a control method according to the present invention may be applied to a portable apparatus that generates a mixture of hydrogen, carbon dioxide, and possibly other gases ("driver gas") by reforming a fuel source, such as coal, with water. A portion of the hydrogen gas is separated from the driver gas mixture by using a gas separator, such as a sorption bed. A portion of the hydrogen gas thus separated may be used to generate power, such as by burning the hydrogen gas in a gas turbine to generate electricity. Finally, a portion of the driver gas, including a portion of the hydrogen gas and the carbon dioxide gas, are injected into an oil well for enhanced oil recovery. The hydrogen may be injected simultaneously with the $CO_2$ into the oil well for enhanced oil recovery or used solely for electricity generation. Depending upon various factors such as the particular composition of the underground oil, as well as the local cost of electrical power, an operator of the present invention may find it advantageous to use hydrogen in different proportions for these various purposes. A control system and a control method according to the present invention automatically control the portable/modular apparatus (called a Driver Gas Generation System, or "DGGS") with minimum human supervision.

A control module is used to control the operation of the DGGS both automatically and based on user-input. The control module may use subsurface data to automatically regulate the operation of the system via feedback control. This allows the DGGS to operate with minimal human supervision or labor. The control module also provides an interface for an operator to control, maintain, and supervise the operation of the DGGS.

The subsurface data used to control the DGGS may include total pressure, partial pressure of carbon dioxide, partial pressure of hydrogen, oil flow rate, gas flow rate, underground temperature, and/or viscosity of the oil. A pressure measurement probe leading down the injection line may measure the total underground pressure. Similarly, the underground partial pressure of the carbon dioxide gas and the partial pressure of the hydrogen gas may be measured by a carbon dioxide/hydrogen pressure probe leading down the injection line. The control module can control the system based on the total measured pressure, as well as the measured partial pressures of hydrogen and/or carbon dioxide gas.

The oil flow rate may be measured by a flow meter, and the control module may control the system based on the reading from the oil flow meter. Additionally, the driver gas flow rate may also be measured by a second flow meter attached to the injection module, and the control module may control the system based on the reading from the driver gas flow meter. The oil flow meter and the driver gas flow meter may also serve a secondary purpose of metering the amount of oil extracted and the amount of driver gas used for system maintenance, optimization, as well as billing purposes. For example, an operator of the system who leases the equipment may pay a leasing fee based on the amount of oil extracted or the amount of driver gas generated.

The control module may also measure the underground temperature of the oil using a temperature probe leading down the injection line, and control the system based on the measured underground temperature. A viscosity probe leading down the injection line may measure the viscosity of the underground oil, and the control module can control the system based on the measured underground viscosity of the oil. The control module may also use other subsurface parameters, or data taken from measurement probes, to automatically regulate the operation of the fuel reformer module, the injection module, and the other sub-systems (modules).

In one embodiment, a control method for controlling the DGGS includes the steps of measuring total pressure inside the oil well, and controlling the driver gas output from the DGGS based on the total pressure. The control method may increase the output from the reformer module when the measured pressure is below a predetermined threshold, and decrease the output from the reformer module when the measured pressure is above a predetermined threshold.

In another embodiment, a control method for controlling the DGGS includes the steps of measuring the partial pressure of hydrogen inside the oil well, and controlling the injection module based on the measured pressure. The control method may control the gas separator module to separate hydrogen gas from the driver gas, and control the injection module to output more hydrogen gas when the measured partial pressure of hydrogen is below a predetermined threshold, and to output less hydrogen gas when the measured partial pressure of hydrogen is above a predetermined threshold.

In yet another embodiment, a control method for controlling the DGGS includes the steps of measuring the partial pressure of carbon dioxide, and controlling the injection module based on the measured pressure. The control method may control the gas separator module to separate carbon dioxide gas from the driver gas, and control the injection module to output more carbon dioxide gas when the measured partial pressure of carbon dioxide is below a predetermined threshold, and to output less carbon dioxide gas when the measured partial pressure of carbon dioxide is above a predetermined threshold.

In yet another embodiment, a control method for controlling the DGGS includes the steps of measuring the viscosity of the oil, and controlling the injection module based on the measured viscosity. The control method may control the injection module to output more driver gas when the measured viscosity is below a predetermined threshold and to output less driver gas when the measured viscosity is above a predetermined threshold.

In yet another embodiment, a control method for controlling the DGGS includes the steps of measuring the flow rate of the oil, and controlling the injection module based on the measured oil flow rate. The control method may control the injection module to output more driver gas when the measured oil flow rate is below a predetermined threshold and to output less driver gas when the measured oil flow rate is above a predetermined threshold.

In yet another embodiment, a control method for controlling the DGGS includes the steps of measuring the gas flow rate of the driver gas, and controlling the injection module based on the measured gas flow rate. The control method may control the injection module to output more driver gas when the measured gas flow rate is below a predetermined threshold and to output less driver gas when the measured gas flow rate is above a predetermined threshold.

The above control methods may be implemented as a control system using negative feedback for controlling the DGGS to extract oil from an oil well in an optimal fashion. The control methods may be implemented in software, which may be stored on one or more computer-readable storage media. The computer-readable media may be used in a general-purpose computer to control the operation of the DGGS.

The control module may also be used to control the apparatus based on input from a human operator. The control module may include a set of controls, or a user interface running on an operating system, for user-driven control of the DGGS. The control module may be remotely operated, such as over the Internet or other network, in order to allow increased flexibility and remote surveillance and monitoring of the operation of the DGGS. An operator may remotely, automatically, and intelligently control the operation of several different DGGS units situated in several different oil wells (which may be situated at several different oil fields, which may be spaced hundreds or even thousands of kilometers apart) from a single control terminal located anywhere on the Internet.

For example, the human operator may use the control module to control the gas separator module and the power generator module based on the local price of electricity. That is, if the local price of electricity has increased and/or the oil site requires more power, the human operator may chose to divert more of the hydrogen to electricity generation rather than for use in oil recovery. The opposite condition may hold if the local price of electricity dropped or if the market price of oil rose; in this case the human operator may divert more of the hydrogen gas for enhanced oil recovery. (Alternatively, this optimization operation may be performed automatically by the control module based on inputs of the market prices and other parameters.) The human operator may also use the control module to turn the apparatus on or off and as well as perform other day-to-day operations and system maintenance.

Other embodiments of the present invention include the control methods described above, but implemented in software and delivered on physical storage media, or implemented in software encoded into hardware. Other features, utilities and advantages of the various embodiments of the invention will be apparent from the following more particular description of embodiments of the invention as illustrated in the accompanying drawings.

BRIEF DESCRIPTION OF THE DRAWINGS

FIG. 15 illustrates an economic model comparing financial multipliers for various fuel combinations for a system generating 250 kcf of carbon dioxide per day;

FIG. 16 illustrates an economic model comparing financial multipliers for various fuel combinations for a system generating 1,000 kcf of carbon dioxide per day.

DETAILED DESCRIPTION OF THE INVENTION

Throughout this disclosure, the symbol "kcf" shall mean "thousand standard cubic feet," usually of $CO_2$ unless explicitly stated otherwise. The symbol "MMcf" shall mean "million standard cubic feet," usually of $CO_2$ unless explicitly stated otherwise. That is, a reformer that produces 1 kcf/day of driver gas produces 1,000 standard cubic feet of driver gas per day, while a reformer that produces 1 MMcf/day of driver gas produces 1,000,000 (1 million) standard cubic feet of driver gas per day. Please note that other sources may use different symbols, such as "mcf" for "thousand cubic feet" based on the Roman numeral "M" for thousand, and care should be taken in terminology when consulting such sources. The word "day" shall mean "a day of operations," which could be an 8-hour day, a 12-hour day, a 24-hour day, or some other amount of time, depending on how a particular oil field is being operated.

Embodiments of the present invention are control methods and control systems for a Driver Gas Generation System (DGGS) whose purpose is to generate a gas mixture that can be used to drive currently unrecoverable oil out of the ground for commercial use. The DGGS may be configured to generate electricity using a portion of the gas mixture. The DGGS is a modular system, which can include all or part of a set of primary components or modules, including a fuel reformer module for generating the driver gas, a gas separator module for separating hydrogen from the driver gas, a compressor module for compressing the driver gas, and a power generator module for generating power from the hydrogen gas.

Embodiments of the present invention include control systems for controlling the various modules, or sub-systems, or components, of the present invention based on such factors as the viscosity of the underground oil and the local price of electricity. First is described the DGGS apparatus and system. Secondly the control systems and control methods according to the present invention are described for controlling the DGGS.

Figure 9:
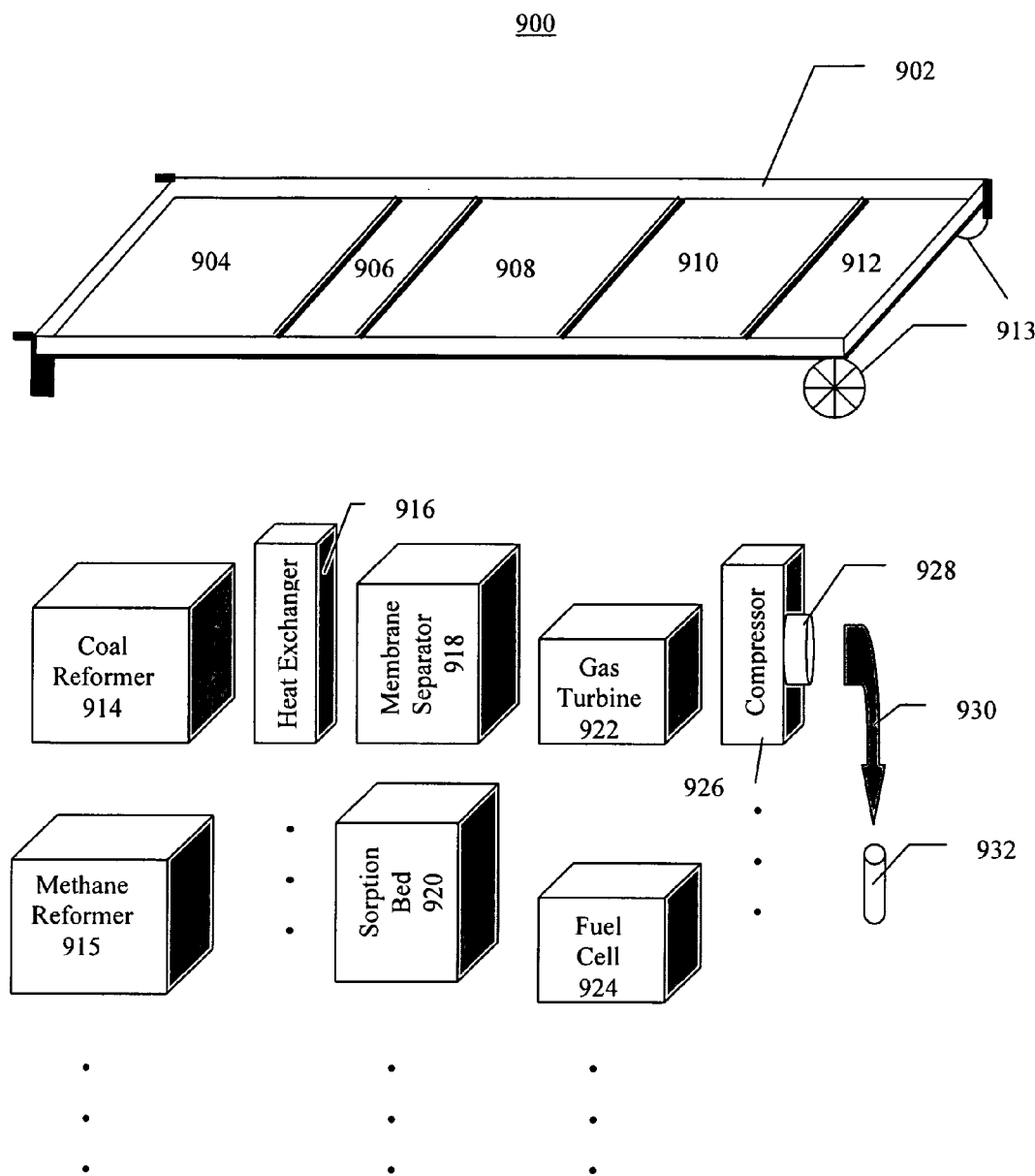
FIG. 9 illustrates a chassis used to support one or more modules according to an embodiment of the present invention.
Figure 10:
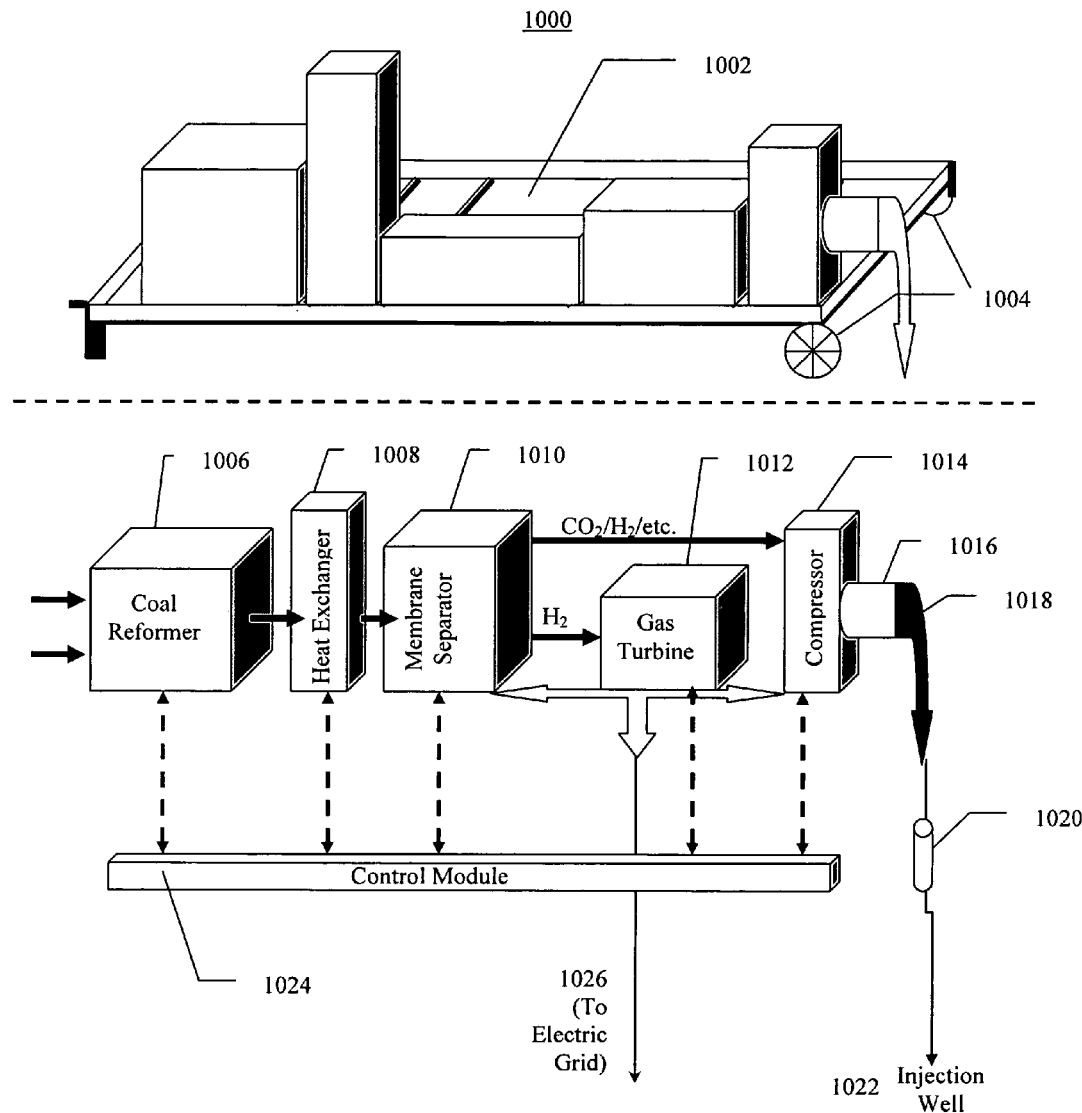
FIG. 10 illustrates an example of an embodiment of the present invention for the extraction of oil from an oil well and for the generation of electrical power.

The DGGS is modular system made up of several modular components. A chassis for supporting the other components, or modules, is provided. The chassis may be attached to an appropriate method of transportation, such as a truck, boat, or aircraft. The chassis, carrying the various modules, may be mounted or carried upon any number of different vehicles. The chassis may have one or more wheels, or it may have no wheels and may instead rely on the wheels of the vehicle. This configuration makes the system highly portable, and allows it to be easily transported to the location of any oil well, including off-shore and remote wells. The chassis is illustrated in FIGS. 9 and 10. Various chassis configurations are possible, and the present invention is not limited to the chassis configuration and design illustrated here.

Figure 3:
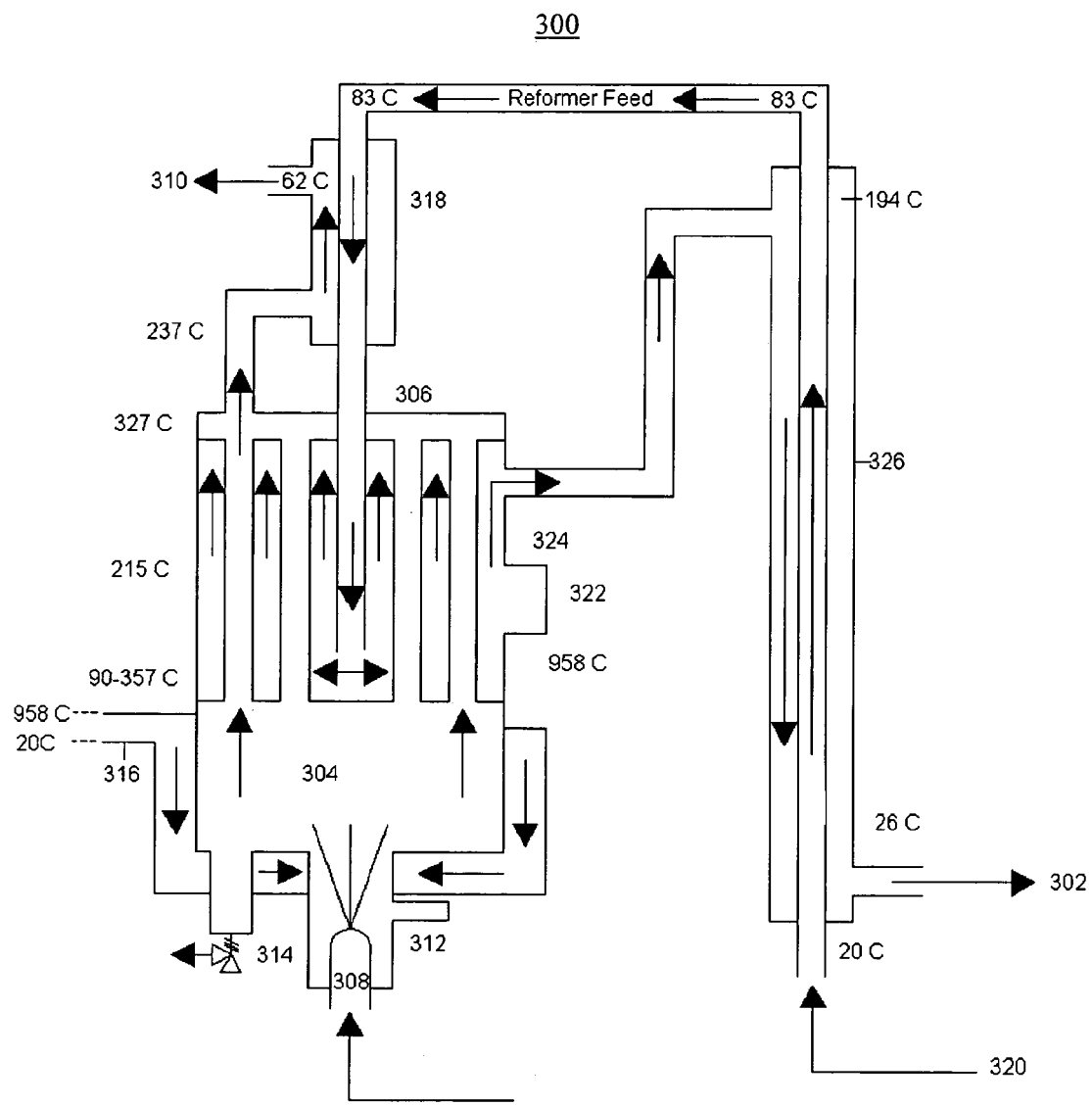
FIG. 3 illustrates an example of an indirect fuel reformer, which serves as part of an apparatus for extracting oil from an oil well, in accordance with an embodiment of the present invention.
Figure 4:
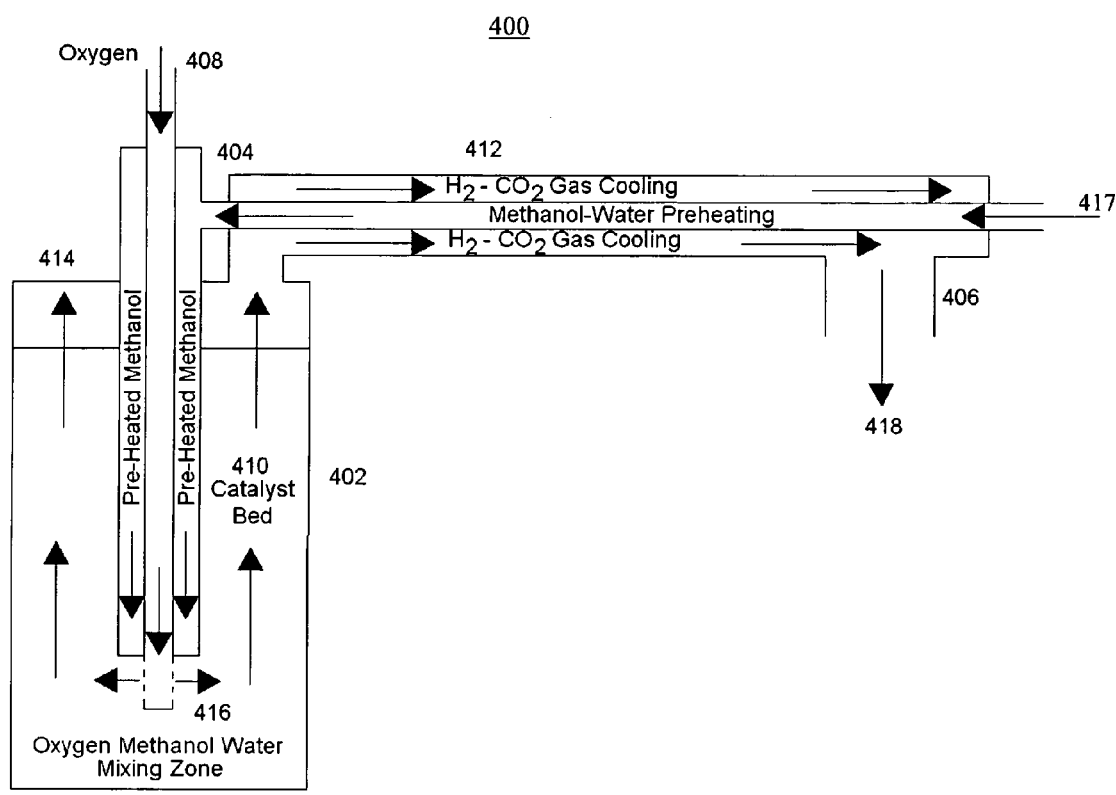
FIG. 4 illustrates an autothermal fuel reformer, which serves as part of an apparatus for extracting oil from an oil well, in accordance with an embodiment of the present invention.

A fuel reformer module, capable of reacting a fuel with water to produce a mixture of $CO_2$ and hydrogen gas, sized to an output rate appropriate for enhanced oil recovery operations, is provided. Depending upon the availability and cost of local fuel types, the reformer modules may be designed to operate with various candidate organic material feedstocks, including coal, crude oil, crop or forestry residues or other forms of biomass, alcohols, natural gas, refined petroleum products, oil shale, tars, and urban, industrial, or rural waste products. In one embodiment of the present invention, an operator is provided with multiple reformer modules to choose from. The operator would select the appropriate reformer module based on local parameters and detailed economic modeling, as will be described in detail below. Examples of the design of the reformer module are provided below, and may include a methanol reformer, a coal reformer, a methane reformer, a local oil reformer, or any other type of reformer module using any other type of feedstock material. Two examples of reformer modules are illustrated in FIGS. 3 and 4. Various reformer modules are within the scope of the present invention, so long as the reformer modules generate driver gas from a fuel source.

A set of heat exchangers, designed to maximize the thermal efficiency of the reformer module as well as the efficiency of the overall system, are provided. The heat exchangers are discussed below in relation to the fuel reformer modules, and illustrated in FIGS. 3 and 4. Various heat exchangers are within the scope of the present invention, and are not limited to the design and configuration illustrated and described here, so long as the heat exchangers perform the function of increasing thermal efficiency of the reformer module or other system modules.

A gas separator module, capable of separating the $CO_2$ from the hydrogen, is provided. This module gives an operator of the DGGS a choice of how much hydrogen to send underground with the $CO_2$, and how much to retain for surface utilization. Candidate separator modules use membranes, Pressure Swing Absorption (PSA), regenerable sorption beds, scrubbing in amine solution, $CO_2$ freezers, or centrifugal separation, and are described in detail below. Various gas separator modules may be used, and the present invention is not limited to the particular gas separators shown or described herein, so long as the gas separators perform at least the function of separating hydrogen gas from the rest of the driver gas.

A compressor module, capable of compressing the driver gas to a pressure appropriate for oil recovery, is provided. The compressor module is capable of compressing the $CO_2$ as well as a portion of the hydrogen intended for underground use, to a pressure appropriate for injection into the oil well. Numerous types of gas compressor modules may be used to compress the driver gas before injection into the oil well. Various compressors are within the scope of the present invention, and are not limited to the designs and configurations illustrated and described here, so long as the compressors can compress the driver gas to a pressure appropriate for injection into the oil well.

An injection module as well as an injection line, capable of sending the driver gas deep into the oil well for use in oil extraction, are provided. The injection module may be a port, a hole, or interlocking mechanism for connecting the compressor module to the injection line. The injection line feeds the driver gas down the injection well. Various injection modules and injection lines are within the scope of the present invention, and are not limited to the various designs and configurations illustrated and described here.

A power generator module, capable of utilizing the hydrogen gas separated by the gas separated to generate electricity, is provided. The power generator module may be a gas turbine, an internal combustion engine, a fuel cell, or any other apparatus, system, or module that can generate power (electrical or mechanical or other) from hydrogen gas. The power generated on-site by the power generator module may be used to support driver gas production processes occurring in the reformer module as well as driver gas compression (compressor module) and injection. In some scenarios, an excess of power is available and may be fed through the electrical power grid to generate additional revenue. Various power generator modules are within the scope of the present invention, and are not limited to the particular power generators shown or described here, so long as the power generators can generate power from hydrogen gas.

A gas capture module, capable of re-capturing a portion of the driver gas emerging with the oil and recycling the driver gas back into the oil well, is provided. The gas capture module allows the $CO_2$ and hydrogen that is released from the oil emerging from the ground to be re-captured and sent via the compressor module and the injection module back underground for reuse. The gas capture module increases the overall efficiency of the oil recovery operation, because a portion of the generated driver gas is recycled and reused. Various gas capture modules are within the scope of the present invention, and the present invention is not limited to the particular gas capture modules or methods shown or described here, as long as the gas capture modules or methods are capable of capturing at least a portion of the driver gas emerging with the oil from the oil well.

Accordingly, one embodiment of the present invention is a control module, capable of controlling the operation of the DGGS both automatically and with user-input. The control module may use subsurface data to automatically regulate the operation of the system via feedback control. This allows the DGGS to operate with minimal human supervision or labor. The control module also provides an interface for an operator to control, maintain, and supervise the operation of the DGGS.

The following discussion describes the Driver Gas Generation System (DGGS). After a thorough discussion of the DGGS, the control systems and control methods for controlling the DGGS according to the present invention are discussed in greater detail.

The various modules are appropriately interconnected after being placed on the chassis. The operation, inter-connection, and use of the various modules are described in greater detail throughout this disclosure. These modular components may be mixed and matched by an operator of the present invention in appropriate combinations based on local conditions and market prices. For example, if the oil site has a high power requirement, or the local cost of electricity is high, the $H_2$ gas may be separated from the $CO_2$ gas using a gas separator, and the $H_2$ gas may be burned in a gas turbine to generate electricity. The electricity may be used on-site to provide power for the oil field, or else sold to an electric distribution company to generate additional revenue by feeding the electricity into the electric grid. Therefore, a portable and modular system is created for enhancing oil recovery wherever a candidate oil field may be, including off-shore and remote oil fields.

Embodiments of the present invention provide for the creation of driver gas which is used for extracting oil from an otherwise depleted oil well, or to drive trapped reservoirs of underground natural gas to the surface. For purposes of the present invention, a driver gas is typically any gas formed during the reforming reactions of the present invention and is preferably a carbon dioxide-rich gas or hydrogen and carbon dioxide containing gas. Various embodiments of the present invention are disclosed herein. Note that the majority of the disclosure is directed toward creating a driver gas that is ultimately injected into depleted oil wells for the extraction of oil; however, methods and apparatus according to the present invention can also be used to create driver gases useful in driving trapped natural gas to the surface. As such, it is noted that the scope of the present invention encompasses the use of driver gas created in accordance with the present invention to drive out other liquids or materials other than oil from depleted oil wells, and in particular encompasses using driver gas to drive trapped natural gas out of underground natural gas reservoirs.

Figure 1:
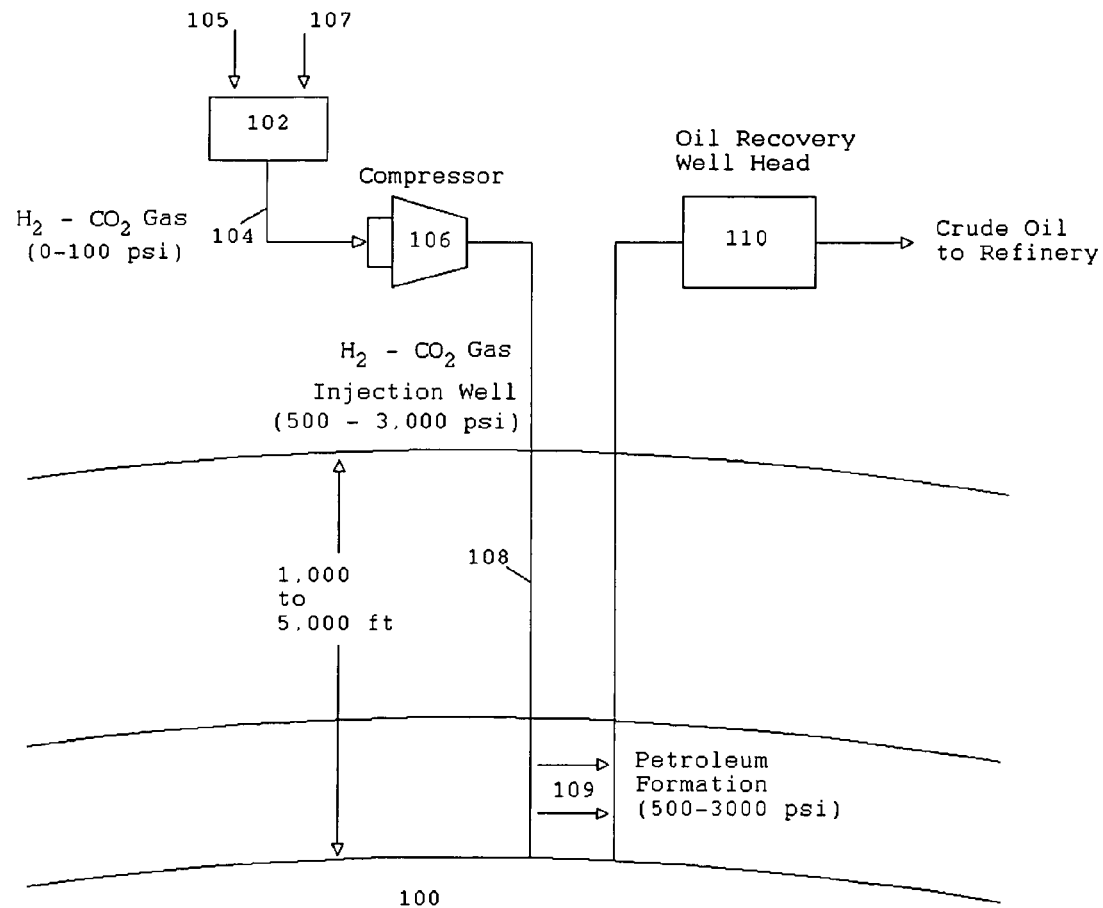
FIG. 1 illustrates an example of an embodiment of the present invention for the extraction of oil from an oil well.

In FIG. 1, an underground oil well 100 (which may be otherwise "depleted") is illustrated, having an amount of oil therein, such as a residual amount of oil. The simplest configuration of the DGGS, having a reformer module and a compressor module, is first discussed. A portable, self-contained reformer module 102 in accordance with the present invention generates driver gas (shown as arrow 104) that may be pumped into the oil well for removing the residual oil 109 from the oil well 100. As explained herein, the reformer module 102 may reform or react fuel sources (shown as arrow 105) such as coal, alcohols, olefins, paraffins, ethers, aromatic hydrocarbons, and other like materials (or mixtures thereof) with (shown as arrow 107) (or without) water to form driver gas 104 which, in one example, is a hydrogen and carbon dioxide gas mixture. The driver gas 104 is then compressed by a compressor module 106 into high pressure gas that could be pumped underground (see line 108) where it could impose pressure on residual underground petroleum 109 sufficient to allow it to be extracted by the same oil well, a nearby oil well 110, or other like site. As shown in FIG. 1, all of the driver gas, including both the carbon dioxide and hydrogen, may be injected into the well for the purposes of oil recovery. In an alternative embodiment, not shown in FIG. 1 and described later, all or part of the hydrogen may be separated from the carbon dioxide and, instead of being injected into the oil well, used for alternative purposes such as the generation of electric power or the hydrogenation of oil.

Figure 2:
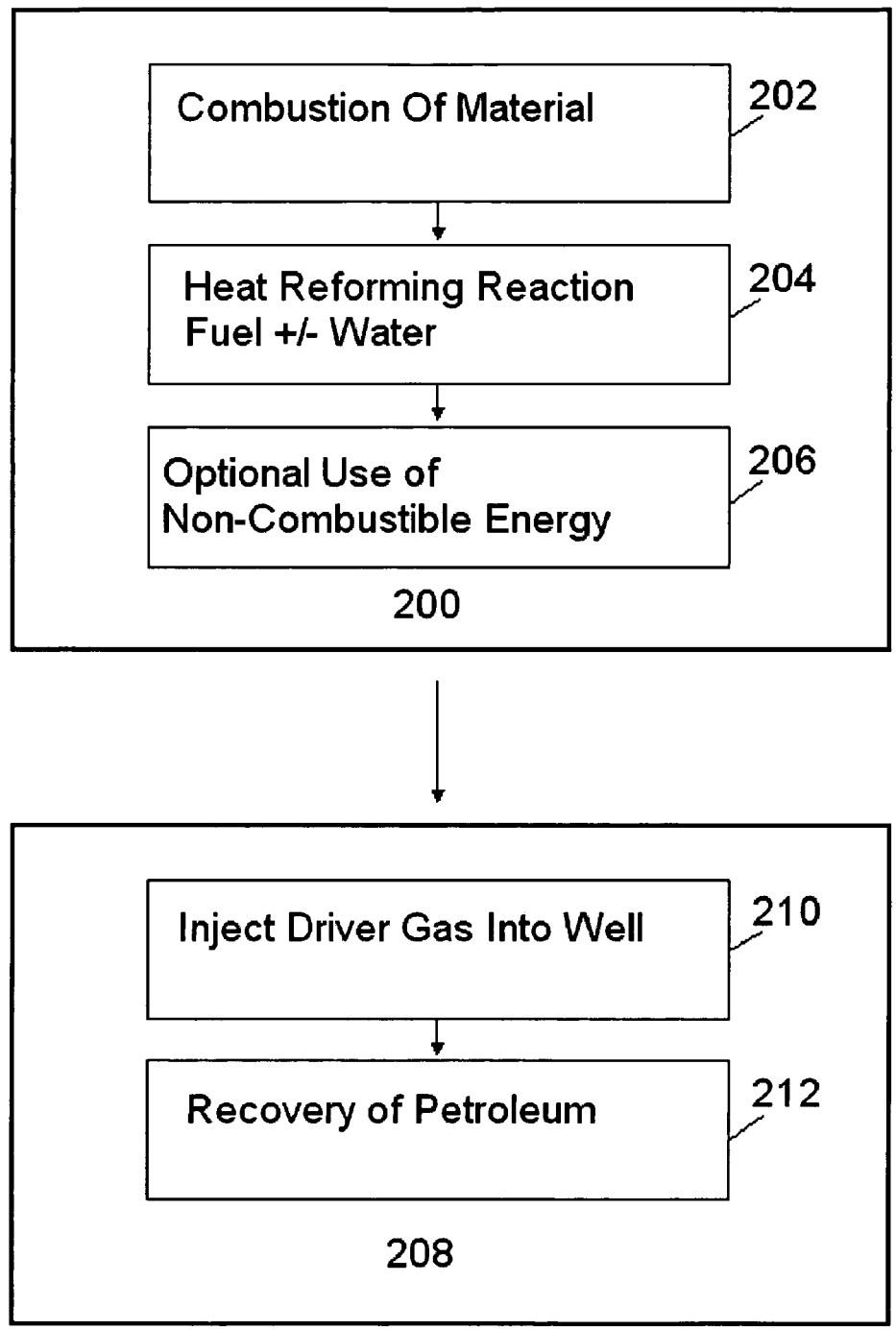
FIG. 2 illustrates an example of operations for extracting oil from an oil well, in accordance with an embodiment of the present invention.

FIG. 2 illustrates an example of operations that may be performed in order to drive petroleum resources out of the ground, such as out of an oil well or a depleted oil well. At operation 1 (shown as element 200), a fuel source is reformed into driver gas. In one example, operation 1 may include combustion of a material 202 such as coal or methanol, in order to provide energy, for instance, within a combustion chamber. The energy generated from the combustion may be used to heat the reforming reaction fuel source to a temperature where the fuel source reacts with (or without) water to form a hydrogen and carbon dioxide rich driver gas 204. Note that the energy used to drive the reforming reaction can also be provided from a non-combustible source, for example, solar energy, nuclear energy, wind energy, grid electricity, or hydroelectric power (shown as element 206).

At operation 2 (shown as element 208), the driver gas is injected into the oil well in order to drive petroleum out of the ground 210. For instance, the injected gas may soften highly viscous petroleum residues and displace them, thereby mobilizing such petroleum residues for recovery by conventional means (shown as element 212).

Reformer Modules

Embodiments of the present invention provide reformer modules for generating driver gas used in petroleum extraction, from among other sites, depleted oil wells. Embodiments of the reformer modules according to the present invention are portable, self-contained, and energy efficient, and are able to generate driver gas through reforming of a fuel source. In some embodiments, the reformer modules utilizes a reforming reaction to generate the driver gas and a combustion reaction to provide the energy required to reform a fuel and generate the driver gas.

In general, the reformer module is an apparatus that may generate carbon dioxide and hydrogen gas mixtures by reforming a fuel source with water. The fuel source may be one of a number of different materials, including coal, methane (natural gas), methanol, other alcohols, or even a portion of the local oil extracted from the oil well.

In one example, the reformer module reforms or reacts a fuel or other hydrocarbon source with water to generate hydrogen and carbon dioxide "driver gas" mixtures. The driver gas is injected into the oil well for enhanced oil recovery. The fuel or hydrocarbon sources used for the generation of driver gas include, but are not limited to, alcohols, olefins, paraffins, ethers, aromatic hydrocarbons, solid hydrocarbons (such as coal), and the like. In addition, the fuel sources can be refined commercial products such as propane, diesel fuels, gasolines or unrefined commercial products such as crude oil, natural gas, or solid hydrocarbons (such as coal). The water can be introduced into the reforming reactor as liquid water, as steam, or, if the fuel is an alcohol or other substance miscible in water, as a component premixed with the fuel.

In some embodiments of the reformer module, the fuel source for the reforming reaction is an unrefined product such as crude oil, and in some embodiments, crude oil captured from the same oil well into which the driver gas is being injected.

The reforming reaction can be driven by the release of energy from a combustible or non-combustible source (such as electricity). In other embodiments, the energy is provided by a combustion reaction using a combustible material and atmospheric air.

In some embodiments, the driver gas is a hydrogen-rich gas mixture. In other embodiments, the driver gas is a carbon dioxide rich gas mixture. In yet other embodiments, the driver gas is a mixture of hydrogen and carbon dioxide gas, in various proportions.

In some embodiments, the reformer module includes a catalyst in the reforming reaction chamber. The catalyst reduces the temperature required to reform the fuel source.

Various embodiments of the reformer module are provided herein based on either separating the reforming reaction from the combustion reaction (referred to herein as indirect reforming module) or based on combining the reforming reaction with the combustion reaction (referred to herein as autothermal reforming module, or direct reforming module). In addition, the reformer modules may include heat exchange elements to facilitate heat transfer from the high temperature driver gas to incoming reformer and/or combustion fuel. The transfer of heat facilitates the reforming reaction and lowers the energy required to complete the driver gas formation. Note that various reformer module configurations are envisioned to be within the scope of the present invention as long as the reformer modules provides for on-site, portable, energy efficient reforming reactions (and preferably steam reforming reactions) that produce driver gas useful in the extraction of petroleum products from an underground source. As such, one illustrative embodiment of an indirect reformer module is described in FIG. 3 for separate reformer and combustion reactions, followed by an embodiment of a direct reformer module described in FIG. 4 for autothermal (direct) reforming and production of driver gas from a single reaction chamber.

Indirect Reformer Module

According to an embodiment of the present invention, disclosed herein is an indirect reformer module adapted to generate driver gas for removing oil from an oil well. In one example, the indirect reformer module may include a first storage container for storing a combustible material used in the combustion reaction; a second storage container for storing a fuel or alternative hydrocarbon source used in the reforming reaction; a third storage container for water to be reacted with fuel in the reformer; a first chamber having an inlet and an outlet, the first chamber for combusting the combustible material with ambient oxygen for the release of energy, the inlet of the first chamber fluidly coupled with the first storage container; and a second chamber having an inlet and an outlet, the inlet of the second chamber fluidly coupled with the second and third storage containers, a portion of the second chamber positioned within a portion of the first chamber, the second chamber fluidly isolated from the first chamber. In one example, the energy released in the first chamber heats the fuel and water sources used in the reforming reaction in the second chamber to a temperature above that necessary for the reforming reaction, thereby reforming the fuel and water sources into driver gas exiting the outlet of the second chamber.

In one example, the first chamber includes an igniter for igniting the combustible material, and the second storage container may include a mixture of water with the reforming reaction fuel source. The second chamber may be adapted to receive a catalyst to reduce the temperature and amount of energy required to heat the reforming reaction fuel and water sources to a temperature above that necessary for the reforming reaction to proceed.

In another embodiment, the indirect reformer module may include a first heat exchange module coupled with the outlet of the first chamber and thermodynamically coupled with the second chamber, the first heat exchange module for preheating the reforming reaction fuel and/or water sources. The indirect reformer module may also include a second heat exchange module coupled with the outlet of the second chamber and thermodynamically coupled with the inlet of the second chamber, the second heat exchange module for preheating the reforming reaction fuel and or water sources and for cooling the generated driver gas.

FIG. 3 illustrates an example of a self-contained, portable indirect reformer module 300 for generating driver gas (shown as arrow 302) for injection into the ground or an oil well, in accordance with one embodiment of the present invention.

In FIG. 3, an embodiment of an indirect reformer module may include a first storage container (not shown) that is fluidly connected to a combustion chamber 304 for burning a combustible material, such as coal, oil, natural gas, an alcohol, an olefin, or other fossil fuel. A second storage container (not shown) is also provided, which may include a reforming reaction fuel source, such as an alcohol, olefin, paraffin, coal/water slurry, oil, natural gas, and the like or mixtures thereof. If the reformer fuel is an alcohol or other chemical miscible in water, the water may be mixed with the fuel in this container. If the reformer fuel is a hydrocarbon such as a paraffin not miscible in water, an additional inlet (not shown) is used for the water to be delivered to the reaction chamber 306.

In one example, a first chamber 304 has an inlet port 308 and an outlet port 310 and is adapted to provide for the combustion of the combustible material. In one example, the first chamber 304 includes an igniter such as a spark plug 312 or other conventional igniter, and a nozzle 314 coupled with the inlet port 308 of the first chamber 304. The inlet port 308 of the first chamber may be coupled with the first storage container (not shown) so that the contents of the first storage container (not shown) may be introduced into and combusted within the first chamber 304. The first chamber 304 also includes a port 316 for introducing combustion air into the first chamber 304. The first chamber 304 is also adapted to receive a portion of the second chamber 306, described below, so that the energy/heat from the combustion of the combustible material from the first storage container (not shown) within the first chamber 304 is transferred into a portion of the second chamber 306. The outlet port 310 of the first chamber 304, in one example, is near the inlet port 320 of the second chamber 306, and a heat exchanger 318 is used to allow the combustion exhaust gas to heat the fuel and water entering the second chamber 306. Alternatively, the outlet 310 of the first chamber can feed to a heat exchanger (not shown) located inside the second chamber 306, which thereby allows the combustion exhaust gases produced in the first chamber 304 to provide the heat to drive the reforming reactions in the second chamber 306.

The second chamber 306 has an inlet port (shown as arrow 320) and an outlet port 302. In one example, the inlet port 320 is coupled with the second storage container (not shown) and receives the contents of the reformer fuel and water storage containers (not shown). The second chamber 306 may also include a port 322 for receiving catalyst material within the second chamber 306.

In one example, the second chamber 306 is positioned within the first chamber 304, such that the combustion heat/energy from the first chamber 304 heats the reforming reaction fuel and water sources contained within the second chamber 306 to a point where the fuel source vaporizes and reforms into a driver gas which exists out of the outlet port 302 of the second chamber 306. In one example, the first and second chambers are fluidly isolated. The driver gas exiting the outlet port 302 of the reformer module may be fed into the other modules of the DGGS, including the compression module for compression, the injection module for injection into the oil well, the gas separator module for the separation of hydrogen from the driver gas, the power generator module for generating electricity, as well as into other modules.

A catalyst may be utilized within the second chamber 306 of the indirect reformer module in order to reduce the temperature and amount of energy required to heat the reforming reaction fuel and water sources to their reaction temperature and such catalysts are dependent upon the fuel source but include iron based catalyst, zinc oxide, copper based catalyst, alumina, and other catalysts. In some reformer modules, a catalyst may not be required; for example, as described below, in high temperature steam reforming of coal, a catalyst may not be needed.

In one example of the indirect reformer module, a first heat exchanger 318 is coupled with the outlet port 310 of the first chamber 304 (the combustion chamber) and is thermodynamically coupled with a portion of the inlet port 320 of the second chamber 306. In this manner, the hot combustion exhaust gases from the first chamber 304 are used to preheat the reforming reaction fuel and/or water sources as they are being introduced into the second chamber 306 for vaporization/reformation into a driver gas.

A second heat exchanger 326 may also be utilized, wherein the second heat exchanger 326 is thermodynamically coupled with the outlet port 302 and the inlet port 320 of the second chamber 306, which provides the dual benefit of preheating the reforming reaction fuel and/or water sources prior to entry into the second chamber 306, as well as cooling the driver gas which is expelled from the outlet port 302 of the second chamber 306. Note that various illustrative temperatures are shown to illustrate heat-exchange, but are not meant to limit the range of temperatures useful in the present invention.

Not withstanding the above examples, the present invention does not require the use of heat exchangers. The use of heat exchangers, or a heat exchange module, is optional. Heat exchangers may be used to increase the efficiency of the reformer module. However, there may be situations in which heat exchangers would not be used, such as when hot driver gas is desired and/or when the reaction fuel and/or water sources are pre-heated.

Autothermal (Direct) Reformer Module

According to another embodiment of the present invention, disclosed herein is an autothermal (direct) reformer module for generating driver gas to remove oil from an oil well. In one example, the autothermal reformer module may include a single reaction chamber for combining a reforming fuel source, water, and an oxidizer; a reforming reaction fuel delivery pipe for delivery of the reforming fuel source; another delivery pipe for water; an oxidizing agent delivery pipe for delivery of oxygen or other oxidizing agent; and a driver gas outlet port for removal of driver gas produced in the reaction chamber. In one example, a counter-flow heat exchange module transfers energy/heat from the released driver gas to the incoming reformer fuel to facilitate the autothermal reformer reaction in the reaction chamber.

In one example of the autothermal reformer module, a reaction chamber heater pre-heats the reaction chamber to initiate the reforming reaction and subsequent formation of driver gas. In another example, the reaction chamber includes a catalyst bed to facilitate autothermal reforming of appropriate reforming fuel sources.

FIG. 4 illustrates an example of a self-contained, portable autothermal reformer module 400 for generating driver gas for injection into the ground or an oil well, in accordance with another embodiment of the present invention. The embodiment illustrated in FIG. 4 provides an "autothermal reformer module" for the production of driver gas that is injected into the ground or an oil well (to remove oil or natural gas or other like materials).

An autothermal reformer module 400 of the present invention directly reacts a reformer fuel source with oxygen or other oxidizers in a single chamber 402. Embodiments of the autothermal reformer module provide an environment for reforming a fuel source from a feed at proper temperature and pressure resulting in the release of driver gas. Since the reforming reaction is favored by low pressure, in some embodiments, pressure in the autothermal reactor is maintained under 50 bar, and preferably under 1 bar. Some embodiments of the autothermal reformer module combine counter-flow heat exchange elements to enhance heat transfer and energy efficiency of the autothermal reformer module.

FIG. 4 shows one embodiment of the autothermal reformer module 400 of the present invention. Note that other autothermal reformer modules are envisioned to be within the scope of the present invention as long as they provide at least a reaction chamber with a reforming reaction fuel source inlet, an air or oxidizing agent inlet, and a driver gas outlet.

Referring to FIG. 4, an autothermal reformer module 400 is shown having a reaction chamber 402, a reforming reaction fuel/water delivery pipe (feed pipe) 404 for delivery of a reforming reaction fuel and water, a driver gas outlet port 406 for release of produced driver gas 418, and an oxygen or other oxidizing gas inlet pipe (gas pipe) 408 for delivery of an oxidizing gas used in the combustion of the reforming reaction fuel in the reaction chamber. In the example shown in FIG. 4, the reformer fuel is methanol, which is miscible in water, and so the fuel/water mixture may be fed into the reaction chamber 402 via a single feed pipe 404. This is also a potentially viable arrangement if the reformer feed is coal/water slurry. In alternative embodiments, not shown in FIG. 4, the reformer fuel may be oil or another combustible material not miscible in water. In such cases, separate feed pipes and inlets for the water and fuel may be required.

Still referring to FIG. 4, the reaction chamber 402 is of sufficient size and shape for autothermal reforming of a fuel source. Different chamber geometries can be used as long as they constrain the autothermal reforming reactions of the present invention and provide sufficient chamber space to produce an amount of driver gas necessary at an oil extraction site. A catalyst bed 410 (see below) is sometimes integrated into the reaction chamber for optimized autothermal reforming reactions. In the embodiment shown in FIG. 4, the fuel/water feed pipe 404 is coupled to the outlet port 406 to form a counter-exchange heat exchanger 412 so that the energy/heat from the exiting driver gas 418 is transferred to the reforming feed entering the reaction chamber 402 via the feed pipe 404. In addition, the feed pipe 404 typically enters at a first or top end 414 of the reaction chamber and releases the fuel/water mixture toward the second or bottom end 416 of the reaction chamber. This configuration enhances heat release from the heated reformer fuel into the contents of the reaction chamber 402. Release of fuel and water into the chamber 402 can be via a nozzle 416 or other like device. A gas pipe 408 is typically coupled to or adjacent to the feed pipe 404 and releases the oxygen or other oxidizing gas adjacent to the release of the reformer feed 417. Note that other configurations of reformer fuel and water delivery, oxygen or other oxidizing agent delivery, and driver gas release are envisioned to be within the scope of the invention and are shown in FIG. 4 as an illustration of merely one embodiment.

When in use, the reaction chamber 402 of the autothermal reformer module is typically preheated to a temperature sufficient to start the reforming reaction, i.e., between approximately 200° C.-400° C. Preheating may be accomplished by a reaction chamber integrated heating element, a heating coil, an external combustor heating system, an internal combustion system, or other like device (not shown).

The reformer fuel source (with or without water, see below) is fed into the reaction chamber 402 via the fuel pipe 404. Note that once driver gas is produced in the reaction chamber 402, the reformer fuel is heated prior to delivery into the reaction chamber 402 by the exiting driver gas (shown as arrow 418) via the counter-flow heat exchange module 412. At approximately the same time that the reformer fuel is being delivered to the reaction chamber 402, the oxygen or other oxidizing agent is being delivered to the reaction chamber 402 via the inlet pipe 408. Various reformer chemical reactions are described below.

In alternative embodiments, not shown, a second, separate fuel may also be fed into the reaction chamber 402. For example, if the primary reformer feed is coal/water slurry, it may be advantageous to also feed into reaction chamber 402 a quantity of natural gas or a quantity of some other highly combustible material, in order to assure that the reaction chamber 402 remains at high temperature and does not quench.

Once the reforming reaction has been established within the reaction chamber 402, the reaction chamber heating element may be shut off to conserve energy. Note also that the amount of water combined into the reforming fuel can be adjusted to control the reforming temperatures.

Chemical Processes

The generation of driver gas(es) will now be described, for example generating driver gas, i.e., a mixture of hydrogen ($H_2$), carbon dioxide ($CO_2$), and possibly other gases. The constituents of driver gas produced by embodiments of the present invention is determined by the reaction constituents and conditions as described below, but generally may include hydrogen gas, carbon dioxide gas, and mixtures thereof.

Embodiments of the present invention provide processes for producing driver gas from the reforming of select fuel sources, such as solid, liquid and/or gaseous hydrocarbons, alcohols, olefins, paraffins, ethers, and other like materials. Illustrative fuel sources for use in the reforming reaction include, but are not limited to, coal, coal/water slurries, methanol, ethanol, propane, propylene, crude oil, and octane.

The combustor fuel can include both refined commercial products such as propane, diesel fuel, and/or gasoline, or unrefined substances such as crude oil, natural gas, coal, or wood. In some embodiments, the driver gas mixture is generated from the steam reforming of clean fuels such as methanol or ethanol. In other embodiments, the driver gas is generated by reforming unrefined hydrocarbon sources such as natural gas, coal, or crude oil, especially crude oil obtained from the oil well site where the driver gas is being injected.

In other embodiments, the driver gas is generated by reforming solid hydrocarbons, such as coal, either as solid coal or in the form of coal/water slurries. The coal used could be lignite, sub-bituminous, bituminous, anthracite, peat, and the like. The solid hydrocarbons may be used for the reforming reaction fuel, the combustion reaction fuel, or both. One advantage of utilizing solid hydrocarbons is the relative low price of coal and other solid hydrocarbons compared to many liquid and gaseous fuels.

The methods of the present invention are reproducible and easily performed in the portable and modular systems described herein. For purposes of generating hydrogen, the processes of the present invention are superior to electrolytic hydrogen generation, which require large amounts of electrical power and are typically non-portable. The processes of the present invention are also superior to the production of hydrogen by cracking or pyrolysis of hydrocarbons without the use of water because much more driver gas is produced for a given amount of fuel consumed.

The methods of the present invention use easily obtained fuel sources such as hydrocarbon sources, water, and atmospheric air.

Embodiments of the invention also include combustible materials to supply the energy to drive the reforming reactions of the present invention. Combustible reactions can include a source of fuel that is burned with ambient oxygen for the release of energy. Note that in alternative embodiments of the present invention, the energy used to drive the reforming reactions of the invention may be provided by non-combustion sources, such as solar, nuclear, wind, grid electricity, or hydroelectric power.

In some embodiments of the present invention, the reforming reaction to generate driver gas and combustion reactions to drive that reaction both incorporate the same fuel. For example, methanol may be used as the reforming fuel source and as the source of combustion to drive the reforming reaction. Similarly, Coal, oil, or natural gas may be used both as the reforming fuel source and as the source of combustion to drive the reforming reaction. Alternatively, different fuel sources may be used for the combustion fuel source and the reforming fuel source.

In more detail, the present invention provides reforming processes of any reforming fuel source to generate, for example, $H_2$, $CO_2$, and possibly other gases. The driver gas reforming reactions of the present invention are endothermic, requiring an input of energy to drive the reaction toward fuel reformation.

In one embodiment, the energy required to drive the reforming reaction is provided through the combustion of any combustible material, for example an alcohol, a refined petroleum product, crude petroleum, natural gas, wood, or coal that provides the necessary heat to drive the endothermic steam reforming reaction.

In other embodiments, the energy required to drive the reforming reaction is provided via any non-combustible source sufficient to generate enough heat to drive the reforming reaction to substantial completion. Examples of non-combustible sources include solar, nuclear, wind, grid electricity, or hydroelectric power.

The present combination of reforming and combustion reactions can be performed within a portable reforming module, for example the modules described above (see FIG. 3 and FIG. 4). This is in contrast to electrolytic hydrogen gas formation, which requires large amounts of electrical power and non-portable machinery for the generation of gas.

The following reactions provide illustrative processes for reforming a fuel source to produce a driver gas used in the recovery of oil or other like materials. Several illustrative combustion reactions that provide the energy required to drive those reforming reactions are also provided. In one embodiment, shown in Reaction 1, a hydrogen and carbon dioxide rich driver gas is formed using pure methanol. Note that the reforming reaction and combustion reaction can be performed in separate reaction chambers (see FIG. 3) or can be combined and performed in a single reaction chamber (see FIG. 4). The following 12 reactions illustrate a separation of the reforming and combustion reactions, however, as shown in FIG. 4 and discussed in greater detail below, an autothermal reforming reaction can be accomplished by directly reacting the fuel sources of the present invention with oxygen in a single reaction chamber. Importantly, these autothermal reactions may be performed in the presence or absence of water.

Separate chamber reactions (see FIG. 3):

$$CH_3OH \rightarrow CO + 2H_2 \qquad \text{Reaction 1:}$$

Reaction 1 comes with an ΔH of +128.6 kJoules/mole. This means that this same amount of energy should be contributed by the combustion reaction to drive the reaction toward the formation of CO and $H_2$.

In an alternative embodiment, the reformed fuel, e.g., methanol, can be mixed with water as shown in reaction 2:

$$CH_3OH + H_2O \rightarrow CO_2 + 3H_2 \qquad \text{Reaction 2:}$$

Reaction 2 comes with an ΔH of +131.4 kJoules/mole. As shown above in Reactions 1 and 2, for a small price in energy, an appropriate fuel source can be cracked to form hydrogen, carbon monoxide, and carbon dioxide. By comparing Reaction 2 to Reaction 1, observe that for essentially the same energy, the use of water allows the hydrogen yield to be increased by 50%. This is why it is generally advantageous to employ both water and fuel in the proposed reforming reactions.

Reactions 3-9 illustrate several other reforming reactions that are in accordance with the present invention.

$$C_2H_5OH + 3H_2O \rightarrow 2CO_2 + 6H_2 \qquad \text{Reaction 3 (ethanol):}$$

$$C_3H_8 + 6H_2O \rightarrow 3CO_2 + 10H_2 \qquad \text{Reaction 4 (propane):}$$

$$C_3H_6 + 6H_2O \rightarrow 3CO_2 + 9H_2 \qquad \text{Reaction 5 (propylene):}$$

$$C_7H_8 + 14H_2O \rightarrow 7CO_2 + 18H_2 \qquad \text{Reaction 6 (toluene):}$$

$$C_8H_{18} + 16H_2O \rightarrow 8CO_2 + 25H_2 \qquad \text{Reaction 7 (octane):}$$

$$CH_4 + 2H_2O \rightarrow CO_2 + 4H_2 \qquad \text{Reaction 8 (methane):}$$

$$C + 2H_2O \rightarrow CO_2 + 2H_2 \qquad \text{Reaction 9 (coal):}$$

Note that in general Reactions 1-9 (as well as other reforming reactions of the present invention) result in large increases in the number of molecules of products compared to reactants, so all are benefited by being performed under low pressure. An important reaction to note is Reaction 9, in which coal is reformed with water to generate carbon dioxide and hydrogen gas. This coal reforming reaction will be described in greater detail below.

In alternative embodiments, the reforming reaction is performed in the presence of a catalyst, for example, when the reforming reaction fuel is an alcohol, e.g., methanol or ethanol, which is combined with water, the feed is passed over a copper on alumina, copper on zinc oxide, or other copper-based catalyst at temperatures above approximately 250° C. (although better results may be obtained at higher temperatures). Thus, for example, the reactor chamber in FIG. 4 could be prepared with a copper on zinc oxide catalyst when the reformer fuel is an alcohol.

When the reforming reaction fuel is a hydrocarbon, e.g., paraffins, olefins, aromatics, combined with water, the feed is passed over an iron based catalyst at temperatures above approximately 300° C. (although better results may be obtained at higher temperatures).

When the reforming reaction fuel is methane combined with water, the feed is passed over a nickel or ruthenium based catalyst at temperatures above approximately 400° C. (although better results may be obtained at higher temperatures).

In some embodiments, such as when the reforming reaction fuel is coal or a derivative of coal, and/or when high temperatures are used in the reforming reaction, no catalyst is necessary, as discussed below in relation to the coal modules.

In some embodiments, combinations of olefins, paraffins, and aromatics (as found in crude petroleum) can be used as the reforming reaction fuel source. In other embodiments, a crude petroleum product is used as the reforming reaction fuel source where the crude petroleum product is first treated to remove sulfur or other impurities (sulfur can poison catalyst involved with the reforming reaction). Note that other reforming reaction fuel sources may also be pre-treated for removal or sulfur or other impurities, for example, natural gas. Sulfur removal is described in greater detail below.

In another embodiment of the present invention, a reforming reaction fuel source can be generated from a pre-source. In one example, gamma alumina is used to react dimethyl ether with water to make methanol via Reaction 10:

$$(CH_3)_2O + H_2O \rightarrow 2CH_3OH \qquad \text{Reaction 10:}$$

The methanol produced in Reaction 10 can then be reacted with more water via Reaction 2 to produce the driver gas used to obtain oil from depleted oil wells, for example. As such, using a mixed gamma alumina and copper catalyst bed, dim ethyl ether and water are reacted to obtain the net result shown in Reaction 11:

$$(CH_3)_2O + 3H_2O \rightarrow 2CO_2 + 6H_2 \qquad \text{Reaction 11:}$$

The energy used to drive the reforming reactions is provided by either combustible or non-combustible sources. In some reactions, the energy is provided by combustion of a combustible material and in some embodiments the combustible material is the same as the reforming reaction fuel source.

An illustrative combustion reaction is shown in Reaction 12. The combustion of a source of fuel supplies the energy to drive reactions 1-11. An illustrative example is the combustion of methanol with ambient oxygen to release ΔH of −725.7 kJoules/mole:

$$CH_3OH + \tfrac{3}{2} O_2 \rightarrow CO_2 + 2H_2O \qquad \text{Reaction 12:}$$

Thus, theoretically (not being bound by any particular theory), for purposes of this illustration, only ⅕ of the mass of methanol is required to be burned to reform methanol via Reactions 1 and/or Reaction 2. This is a small price to pay given that most fuels used in the reforming reaction are cheap, easy to store as a liquid or solid and readily available, even in remote areas of the world.

Alternatively, in another embodiment, solid hydrocarbons (such as coal), may be burned/combusted to generate the energy required to drive the reforming reactions 1-11, as shown in Reaction 13 (releasing ΔH=−92 kcal/mole):

$$C + O_2 \rightarrow CO_2 \qquad \text{Reaction 13:}$$

An advantage of using coal, a derivative of coal, or other solid hydrocarbons is the relative inexpense of coal as compared to liquid or gaseous fuels.

In general, the required energy to drive the reforming reactions of the present invention may be furnished by burning small fractions of the reforming reaction fuel source or by using an alternative fuel or other heating methods such as nuclear, solar or electric grid power. In each case, a much larger number of product molecules is produced than is burned or reacted, allowing a much larger amount of fuel to be driven out of the ground than must be used to obtain it. The driver gas consists of mixtures of hydrogen and carbon dioxide, neither of which will react with petroleum, and both of which can serve to reduce its viscosity and provide pressure to drive the petroleum from the ground.

In yet another embodiment, carbon monoxide derived from various reforming reactions is separated from the hydrogen gas using a membrane or other separation device and further burned to provide additional energy to drive the reforming reaction, as shown in Reaction 14.

$$CO + \tfrac{1}{2} O_2 \rightarrow CO_2 \qquad \text{Reaction 14:}$$

The burning of CO results in an ΔH of −283.0 kJoules/mole, again releasing heat for use in driving the reforming reactions illustrated in Reactions 1-11, as well as generating addition $CO_2$.

With regard to autothermal reforming, a reforming fuel is directly reacted with oxygen in the presence or absence of water. In alternative embodiments, to facilitate combustion of all of the reforming fuel, oxygen gas, air, or alternative oxidizer materials, e.g., hydrogen peroxide, or nitrous oxide, is metered in an amount to react with all of the carbon contained in the reforming fuel. The thermodynamics of the autothermal chemical reactions and the presence of a proper catalyst with proper selection of operating temperature and pressure result in formation of substantially only carbon dioxide and hydrogen gas. However, in use, small amounts of water and other compounds may form by combustion of hydrogen or other byproduct reactions. Where air is used as the oxidizer, there will also be nitrogen left over which can serve as part of the driver gas.

Coal Reformer Modules

In one embodiment of the present invention, a coal reformer module, which is capable of reacting coal with water to generate the driver gas, is used as the fuel reformer module. A significant advantage of utilizing a coal reformer module is the extreme low cost of coal in relation to liquid or gaseous fuels. A potential disadvantage is the higher storage, transport, handling, and processing costs associated with utilizing coal. The coal reformer module may be especially advantageous in locations where coal is readily and/or cheaply available at or near the site of the oil well, as is often the case at many oil fields. The main advantage of the modular aspect of the present invention is an operator's ability to customize and optimize the DGGS to local and changing conditions. Therefore, an operator may use a coal module at a location where coal is readily available, but may use a methane module where methane is readily available.

As shown by Reaction 9, coal may be used as the hydrocarbon feed for steam reforming to generate carbon dioxide and hydrogen driver gas. Coal molecules contain carbon and hydrogen with varying amounts of sulfur, nitrogen, and oxygen. Coal also contains variable amounts of moisture and inorganic mineral matter (a mixture of silicon, aluminum, calcium, magnesium iron, sodium, potassium, and other oxides plus iron sulfides). To utilize coal as a feedstock material, some additional processing steps are added to the process described above to handle solid feeds and the presence of sulfur contaminants. Alternatively, coal may be powdered and mixed with water to form a slurry, which may be handled by the systems of the present invention as a liquid feed.

Coal is generally the lowest-cost steam reforming feedstock. For example, coal may be obtained at a typical cost of $30 per ton (approximately 3 cents per kilogram), and coal with a high water-content (which is usable in this application since water is also a reactant) may be obtained at a significantly lower cost.

As used herein, the term "coal" may include any solid hydrocarbon, and derivatives thereof, including but not limited to lignite, sub-bituminous, bituminous, anthracite, peat, and the like. The term "coal" is also intended to include derivatives of coal, including but not limited to coal of all particulate sizes, crushed coal, pulverized coal, coal/water slurries, liquefied coal, etc.

For utility power generation, coal is usually prepared and shipped as approximately 2-inch top-size product. However, many coal producers ship coal of other particle sizes for industrial boilers, metal casting, and other applications. For driver gas applications, coal of approximately 1-inch or smaller top size is preferable as feed to the reformer module. Alternatively, coal may be powdered and mixed with water to form a slurry, which may be handled by the reformer system as a liquid feed.

The present invention provides for at least three possible coal-steam reforming modules, but is not limited to the three coal reformer modules described here. These include the fixed-bed reformer module (FIG. 5), the fluidized-bed reformer module (FIG. 6), and the entrained-flow reformer module (not illustrated). The coal reformer modules increase in complexity in the order listed. The solid residue handling requirements also increase in complexity in the same order. However, reaction rates also increase in complexity in the same order, leading to reduced equipment sizes for a given throughput. Each coal-steam reformer module may be implemented as an indirect reformer configuration (as shown in FIG. 3), or as an autothermal reformer configuration (as shown in FIG. 4).

Table 1 shows important features that distinguish the three possible coal-steam reformer modules. Values are shown to illustrate relative differences in the module parameters.

TABLE 1

| | Operating parameters of various coal-steam reformer modules | | |
|---|---|---|---|
| Operating Parameter | Fixed-Bed Reformer (FIG. 5) | Fluidized-Bed Reformer (FIG. 6) | Entrained-Flow Reformer (not illustrated) |
| Feed Particle Size | approx. <1" | approx. <1/4" | approx. <0.1" |
| Temperature | approx. >700° C. | approx. >800° C. | approx. >1,200° C. |
| Solids Retention Time | greatest | intermediate | shortest |
| Gas Retention Time | longest | shorter | shortest |

All three coal reformer modules operate at sufficient temperature to eliminate catalyst requirements for steam reforming. The fixed-bed and fluidized-bed reformer modules are able to accept coal of the delivered particle size. The entrained-flow reformer module would require additional grinding or pulverizing after delivery of the coal to the oil site and before injection into the entrained-flow reformer module.

Figure 5:
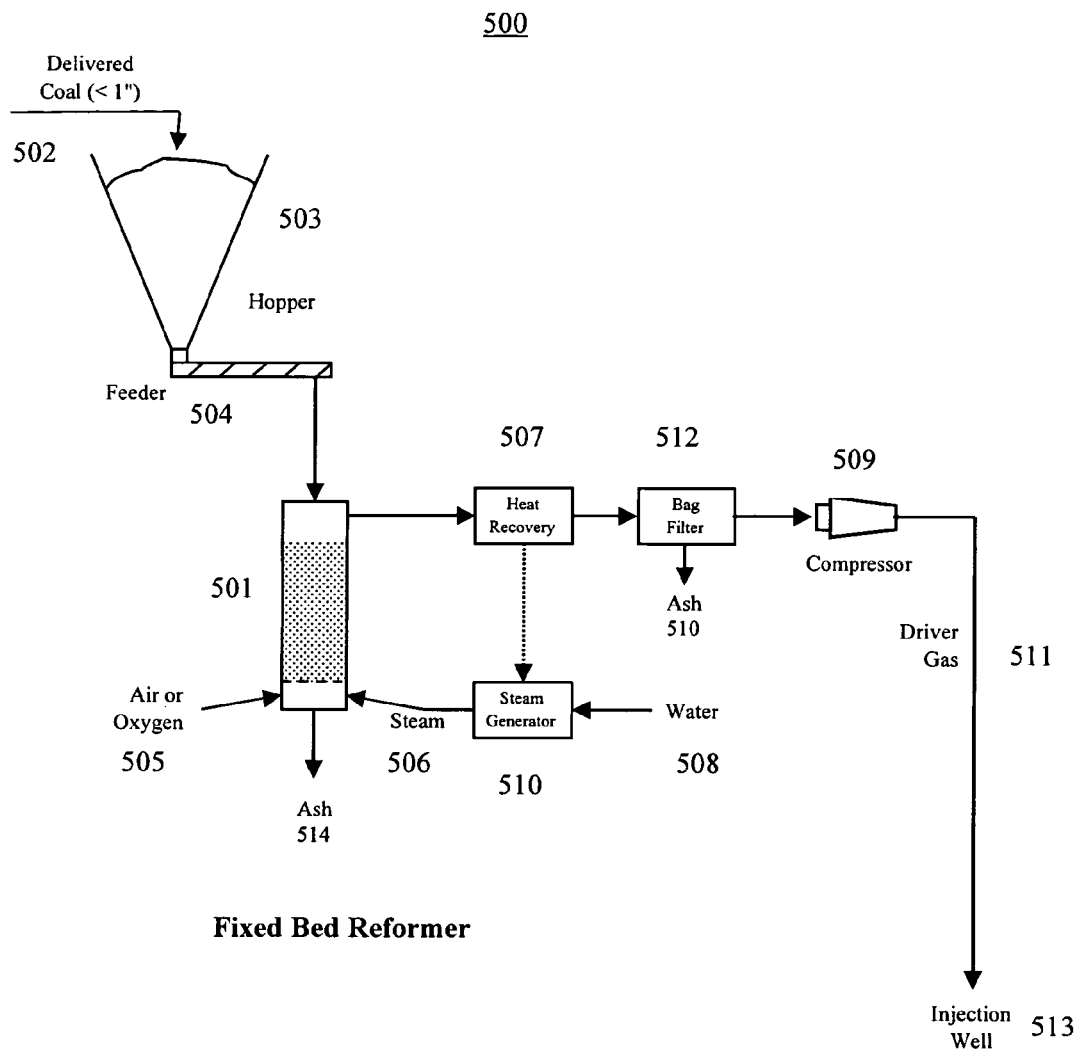
FIG. 5 illustrates an example of a system utilizing a fixed-bed reformer for extracting oil from an oil well, in accordance with an embodiment of the present invention.

In one embodiment of the present invention 500, depicted in FIG. 5, a portable self-contained fixed-bed coal reformer module 501 is used to generate driver gas for injection into the ground of an oil well. In the reaction chamber of the fixed-bed reformer module, nearly all the feed and residue particles remain in reaction chamber 501 during reforming. Delivered coal 502 with a feed particle size of less than approximately 1-inch is introduced into hopper 503. The coal 502 is then fed into fixed-bed reformer module 501 through feeder 504. Combustion air or oxygen (shown as arrow 505) and steam (shown as arrow 506) are also fed into the fixed-bed reformer module 501. In one example, heat recovered from the gas exiting the reformer module 501 is directed into heat recovery module 507. The heat can be sent to steam generator 510 to convert water (shown as arrow 508) into steam (shown as arrow 506). Alternatively, the heat can be used to generate electrical or mechanical power to drive compressor module 509 or other hardware at the oil site.

The fixed-bed reformer module 501 may be fed and discharged in batch mode, semi-batch mode (incremental feeding and discharging of ash), or continuous mode. In the fixed-bed reformer module 501, the inorganic matter (coarse ash) 514 remaining after steam reforming is largely handled in the form of coarser particles that can be removed from the bottom of the reactor chamber. Smaller amounts of ash are entrained in the low velocity exhaust gas exiting the reformer module. This fine ash 510 is removed through bag filter 512. Subsequently, the purified driver gas is pressurized in compressor module 509 to generate pressurized driver gas (shown as arrow 511) that is injected into injection well 513. The compressor module 509 compresses the driver gas to a pressure appropriate for the oil well, potentially utilizing a feedback pressure control system as described below.

Figure 6:
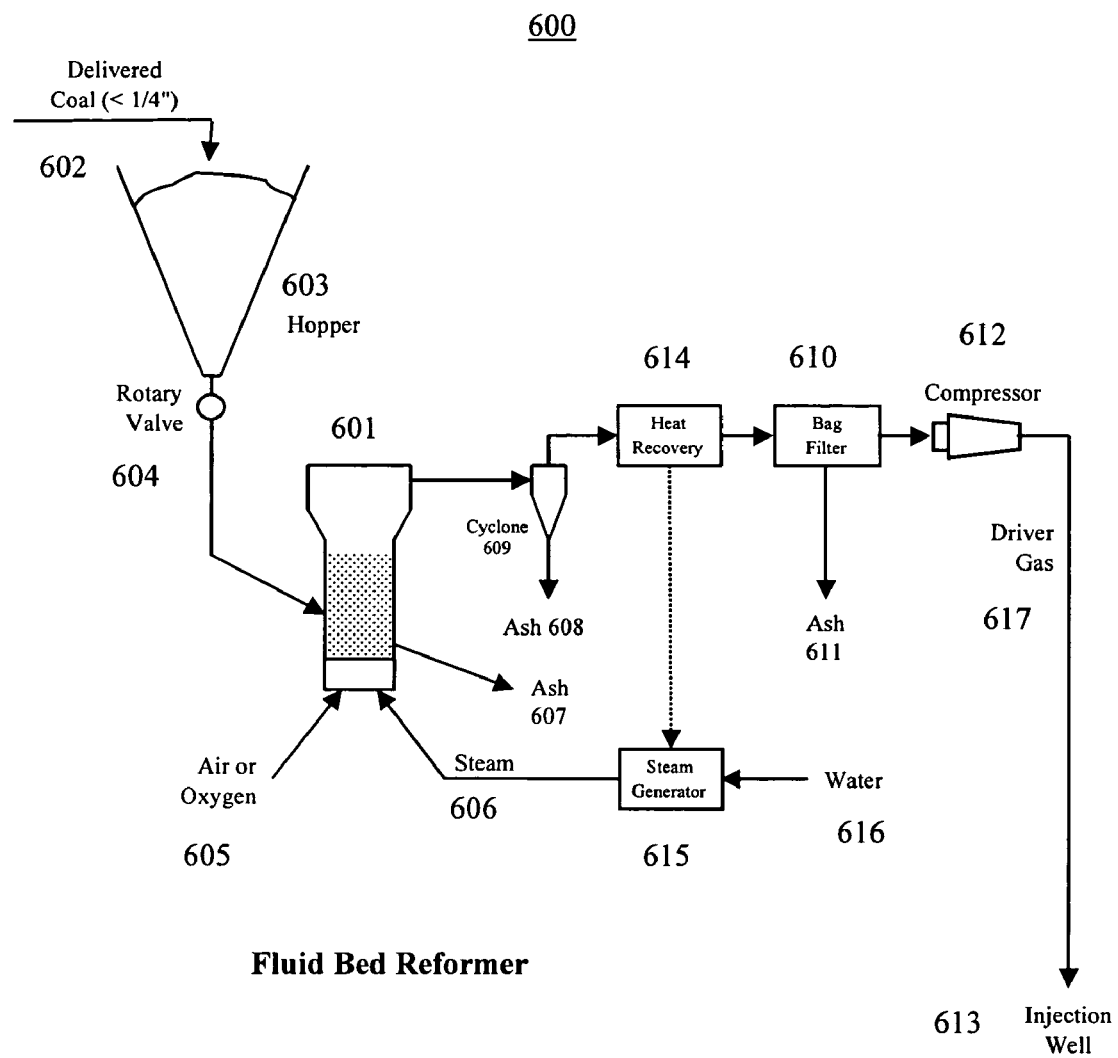
FIG. 6 illustrates an example of a system utilizing a fluidized-bed reformer for extracting oil from an oil well, in accordance with an embodiment of the present invention.

In an alternative embodiment 600 of the present invention, depicted in FIG. 6, a portable fluidized-bed reformer module 601 is used to generate driver gas for injection into the ground of an oil well. In the fluidized-bed reformer module 601, most particles remain in the reaction chamber, but finer particles are entrained with the exhaust gas. That is, compared to the fixed-bed reformer module 501 of FIG. 5, greater amounts of fine particles are entrained in the higher velocity exhaust gas (relative to the exhaust gas generated in the fixed-bed reformer module) and must be removed prior to compression of the driver gas. The coarsest of the entrained particles are removed from the gas stream and can be recycled to the reactor or discharged as residue. The remaining finest particles are removed by filtration.

FIG. 6 illustrates an example of a system utilizing the fluidized-bed reformer module 601. Delivered coal 602 with a feed particle size of less than approximately ¼-inch is introduced into hopper 603. The coal is fed into fluidized-bed reformer module 601 upon opening of the rotary valve 604. In the fluidized-bed reformer module 601, combustion air or oxygen (shown as arrow 605) and steam (shown as arrow 606) are also fed into the fluidized-bed reformer module 601. It is noted that in the fluidized-bed reactor module 601, continuous feeding with semi-continuous discharge of coarser ash 607 is preferable. Intermediate ash 608 in exhaust gas exiting the fluidized-bed reformer module 601 is removed by cyclone separator 609 (to remove intermediate-sized particles) and bag filter 610 (to remove the finest particles of ash 611) prior to pressurization of the driver gas in compressor module 612 to generate pressurized driver gas 617 that is injected into injection well 613. The intermediate-sized particles separated by cyclone 609 can be recycled to the fluidized-bed reformer module 601 or removed as residue, depending on the extent of their conversion during reforming. In one embodiment of the fluidized-bed reformer module 601, exhaust gas existing cyclone 609 enters heat recovery unit 614. The heat can be sent to steam generator 615 to convert water (shown as arrow 616) into steam (shown as arrow 606). Alternatively, heat recovered from the reformer module 601 can be used to generate mechanical power to drive compressor module 612 or other hardware at the oil site. The compressor module 612 compresses the driver gas to a pressure appropriate for the oil well, potentially utilizing a feedback pressure control system as described below.

In another embodiment of the present invention (not illustrated), a portable, entrained-flow reformer module is used rather than a fixed-bed or fluidized-bed reformer module. In an entrained-flow reformer module, virtually all particles are removed with the exhaust gas steam exiting the entrained-flow reformer module. The feed particle size using the entrained-flow reformer module is generally less than approximately 0.1-inch. Compared to the fixed-bed and fluidized-bed reformer modules, the entrained-flow reformer module would require additional grinding or pulverizing of the coal after delivery to the oil site and before injection into the entrained-flow reformer module. Furthermore, with the entrained-flow reformer module, the entire feed stream is entrained and removed from the reaction chamber at high velocity. Cyclone and filtration hardware similar to those of the fluidized-bed reformer module are used, but removal capacities must be greater.

In all three coal reforming modules described above, the modules operate at sufficient temperature to eliminate catalyst requirements for steam reforming. Generally, the fixed-bed reformer module may operate at temperatures above approximately 700° C., while the fluidized bed reformer module may operate at temperatures above approximately 800° C. The entrained-flow reformer module may operate at temperatures in excess of approximately 1,200° C. These temperature ranges are illustrative only, and are not intended to limit the scope of the present invention. All three coal reforming modules may operate over temperature ranges outside those temperature ranges disclosed here.

The fixed-bed reformer 501 of FIG. 5 and fluidized bed reformer 601 of FIG. 6 may be designed as illustrated in FIG. 3 or FIG. 4. That is, the steam reforming of coal can be carried out using an indirect reformer, as in FIG. 3, or a direct ("autothermal") reformer, as depicted in FIG. 4. Indirect reforming requires heat exchange between the heat source (coal combustion, for example) and the reformer. Driver gas produced from indirect steam reforming results in a greater hydrogen: carbon dioxide ratio than driver gas produced from direct ("autothermal") reforming. It will be appreciated that the combustible material may be coal, or alternatively may be an alcohol, olefin, natural gas, oil, or other combustible source.

Autothermal reforming eliminates the heat exchange requirement since partial combustion is performed in the reforming reaction chamber to generate heat. Using oxygen for the oxidizer, the autothermal reformer product gas is still a mixture of carbon dioxide and hydrogen, but the hydrogen: carbon dioxide ratio is lower than that for indirect reforming. Using air as the oxidizer, the autothermal reformer product gas is diluted with nitrogen. Both indirect and autothermal reforming using air or oxygen are valid methods for driver gas generation. Specifics of feed coal quality, capital costs, and driver gas requirements will lead to the optimum selection for each enhanced oil recovery application.

Three illustrative coal reformer modules have been described and shown here. However, the present invention is not limited to these three coal reformer modules, and any coal reforming module or apparatus is within the scope of the present invention, as long as the module can receive coal or coal/water slurry and generate driver gas.

Sulfur Removal in Coal Reformer Modules

Because steam reforming of coal is performed without catalyst, reforming catalyst poisoning by sulfur compounds is not an issue. In cases where a low-sulfur coal feed is used, sulfur clean up of the exhaust gas may not be required at all. In the event of potential issues with corrosion caused by sulfur-containing gases in combination with any residual moisture, several sulfur treatment and removal methods are possible. These may be implemented as modular components that may be brought to the oil site and attached to the coal reformer module. Alternatively, the sulfur removal components may be integrated directly into the coal reformer module.

Dry sorbents may be used to capture sulfur in the exhaust gas. Calcium oxide, magnesium oxide, and sodium carbonate are examples of dry sorbents that are capable of trapping sulfur gases in solid form (as sulfates or sulfites, depending on the relative oxidation conditions). When the operating temperature and pressure permit effective sulfur capture, dry sorbent can be added in a coarse form with the coal feed to fixed- or fluidized-bed reformer modules. The resulting sulfur-containing product can then be removed from the reactor chamber with the ash remaining after reforming. Alternatively, a finer sorbent can be injected into the gas down stream of the reactor. Sulfur containing solids can then be collected in the cyclone or bag filter. For the entrained-flow reformer module, a sorbent will likely perform better by injection into partially cooled gas down stream of the reactor.

In large-capacity systems, a dry sorbent may be injected in a separate unit down stream of the final ash particulate filter. The sulfur product can then be collected separately in another filter and can potentially be sold as a product.

Sulfur may also be removed by using a wet scrubber module. Wet scrubbers can be configured in venturi, packed-column, or tray-type systems in which the cooled gases are contacted with a scrubbing solution or slurry. The resulting scrubber solution or slurry must then be disposed.

In all reformer embodiments, the hydrogen and carbon dioxide driver gas may be sent into the well for the purpose of oil retrieval, or alternatively, part or all of the hydrogen product may be separated and sent to a generator to produce electric power, or used for hydrogenation of oil in petrochemical processing, or for other purposes.

Methane Reformer Module

In another embodiment of the present invention, a methane reformer module, which is capable of reforming methane ($CH_4$, the major constituent of, and sometimes referred to as, natural gas) to generate the driver gas, is used as the reformer module. A potential advantage of methane, despite its higher cost relative to coal, is the relative ease with which methane may be handled as compared to coal. The only pre-processing step associated with methane is the removal of possible sulfur contaminants. No bulk handling of solid hydrocarbons or the associated transport and processing steps are required. The methane reformer module is an even more attractive choice in locations where methane is readily and cheaply available at or near the site of an oil well, as is often the case. The cost of methane at an oil well may be significantly below its market price to the consumer. This is because methane is often produced from the same field, or even the same well, as the oil. Therefore, there would be no transportation or consumer-end processing costs associated with utilizing the locally available methane in a methane reformer module. Furthermore, in many remote oil extraction locations (such as parts of South America and off-shore locations), it is extremely difficult and costly to transport methane to the end-user (since methane is a gas at ambient conditions), and therefore the methane recovered with the oil is often considered a waste product that is "flared" or burned. Therefore, at such oil sites, it is extremely economical to utilize the methane in a methane reformer in the systems of the present invention. Because the present invention is highly modular and highly portable, an operator working in such remote locations may easily transport the methane reformer module and other modules to locations of those oil fields where methane is currently being flared.

The natural gas (methane, $CH_4$) may be either raw or refined. The natural gas is fed with steam to a reactor in which an appropriate catalyst is present. The catalyst is used to maintain selectivity toward the desired carbon dioxide and hydrogen products. Like the methanol or coal reformers, the natural gas reformer may be constructed as an indirect or autothermal reformer with the same considerations cited above.

Figure 7:
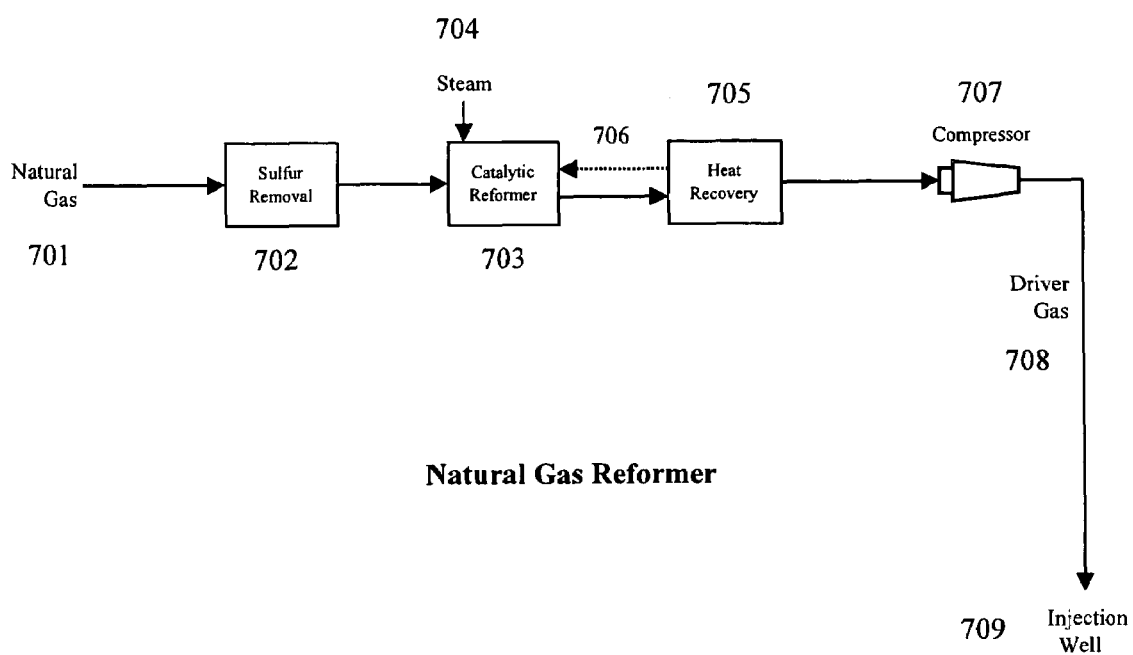
FIG. 7 illustrates an example of a system utilizing a natural gas reformer for extracting oil from an oil well, in accordance with an embodiment of the present invention.

FIG. 7 shows a schematic of a system 700 utilizing a methane reformer module 703. Natural gas (methane) 701, either from off-site or on-site, is fed via a line into sulfur removal module 702. Desulfurized natural gas is fed via another line into methane reformer module 703. Steam 704 is added to methane reformer module 703. The exhaust driver gas exiting the methane reformer module 703 is passed through a heat recovery module 705, which could be a set of heat exchangers, in which a portion of the heat 706 is recycled back into the methane reformer module 703. The cooled driver gas is passed to compressor module 707. The compressor module 707 compresses the driver gas to a pressure appropriate for the oil well, potentially utilizing a feedback pressure control system as described below. Finally, the high pressure driver gas 708 is injected via an injection line into injection well 709. The oil is recovered using the same injection well 709 ("Huff-and-Puff") or another production well (not shown).

As with the coal reforming modules, heat recovered from the natural gas reformer module may be used to generate electrical or mechanical power to drive the compressor module or other system hardware. Additional and potentially much greater amounts of power may also be produced by splitting part of the hydrogen product from the driver gas stream and using it to generate power in a gas turbine, fuel cell, internal combustion engine, or other power generation system.

If refined, desulfurized natural gas is used, no gas clean up is required. That is, the sulfur removal module 702 in FIG. 7 is not needed and may be removed. If raw natural gas is used, sulfur must generally be removed before the reformer module 703 to prevent catalyst poisoning. Sulfur contained in natural gas can be removed on catalysts or sorbents such as zinc oxide, activated carbon (with chromium or copper), nickel oxide, or certain molecular sieves (13×). Some of these sorbents work at ambient temperature; others require elevated temperatures.

Once captured, the sorbents may be disposed or regenerated. Many of the sorbents release trapped sulfur as hydrogen sulfide gas. If desired, the released hydrogen sulfide can be collected as elemental sulfur using methods such as the Claus process. In the Claus process, a portion of the $H_2S$ is reacted with oxygen to form $SO_2$. The $SO_2$ then reacts with the remaining $H_2S$ to form elemental sulfur and water. The elemental sulfur may be recycled or sold to the petrochemical industry for additional revenue.

Local Oil Reformer Module

In yet another embodiment of the present invention, a portion of the local oil may be used as the fuel source for the reforming reaction. This is highly convenient, and under some conditions may be highly economical. Local, unrefined oil may be significantly cheaper than oil for the end-consumer because no transportation or processing is required. Accordingly, in one embodiment of the present invention, an oil reformer module is used, in which a portion of the oil extracted from the oil well is used in a closed-loop system as a reforming fuel source.

Figure 8:
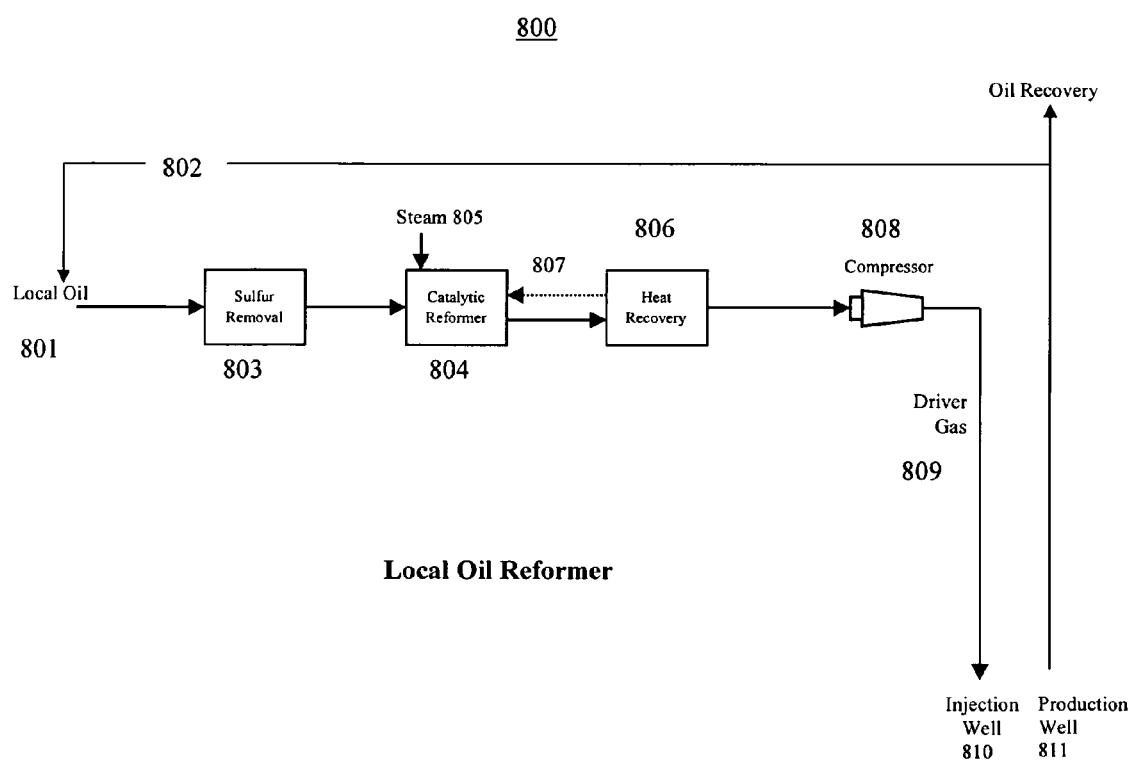
FIG. 8 illustrates an example of a system utilizing a portion of the locally recovered oil for extracting oil from an oil well, in accordance with an embodiment of the present invention.

FIG. 8 shows a schematic of a system 800 utilizing an oil reformer module 804. A portion of the petroleum (oil) 801 recovered from the oil site is fed via line 802 into sulfur removal module 803. Desulfurized petroleum is fed via another line into oil reformer module 804. Steam 805 is added to oil reformer module 804. The exhaust driver gas exiting the oil reformer module 804 is passed through a heat recovery module 806, which could be a set of heat exchangers, in which a portion of the heat 807 is recycled back into the oil reformer module 804. The cooled driver gas is passed to compressor module 808. The compressor module 808 compresses the driver gas to a pressure appropriate for the oil well, potentially utilizing a feedback pressure control system as described below. Finally, the high pressure driver gas 809 is injected via an injection line into injection well 810. The oil is recovered using the same injection well 810 ("Huff-and-Puff") or another production well 811. A portion of the recovered oil is fed via line 802 back into sulfur removal module 803, therefore completing the closed-loop system. A small portion of the oil recovered is reformed, or sacrificed, in order to extract a significant amount of oil from the oil well.

When using locally produced crude oil in the reformer module, as when using coal or natural gas, sulfur removal may be necessary, and may be effectuated in a similar manner.

Gas Separator Module

According to the present invention, a portable, highly economic $CO_2$ and $H_2$ generation system is provided which enables enhanced oil recovery to be conducted wherever the candidate oilfield may be. The DGGS produces large quantities of both carbon dioxide and hydrogen gas. The $CO_2$ may be injected into an oil well for enhanced oil recovery. The hydrogen gas may be used to enhance underground oil recovery in a similar fashion to $CO_2$ (as described above), or alternatively split off from the $CO_2$ product to be used for other purposes, including power generation or the hydrogenation of oil in petrochemical processes.

Hydrogen gas may be mixed with the carbon dioxide gas and injected into the oil well. Alternatively, the hydrogen may be separated from the carbon dioxide. The hydrogen gas may be injected into the oil well, followed by injecting carbon dioxide gas. Alternatively, the carbon dioxide gas may be injected first, followed by injecting the hydrogen gas.

The hydrogen gas may be sold to the petrochemical industry for hydrogenation or other purposes. If hydrogen becomes a popular clean-burning fuel in the future, the hydrogen may be sold for other purposes, such as to the transportation industry for hydrogen-electric cars. Alternatively, the hydrogen may be used for electrical power generation. For example, the hydrogen may be burned, using for example a gas turbine, to generate electricity. The electricity may be used to provide power for various operations of the oil site. Alternatively, the electricity may be sold to utility companies by feeding the electricity into the electric grid.

In order to support any of the above operations, a means to separate at least a portion of the hydrogen gas from the rest of the driver gas is needed. The gas separator module is used to separate the hydrogen gas from the carbon dioxide gas (as well as the rest of the driver gas). The gas separator module gives an operator of the present invention a choice of how much hydrogen to send underground with the $CO_2$, and how much to retain for surface utilization. Various methods may be used to separate hydrogen gas from carbon dioxide gas. Candidate separator modules use membranes, Pressure Swing Absorption (PSA), regenerable sorption beds, scrubbing in amine solution, $CO_2$ freezers, or centrifugal separation.

One class of embodiments of the hydrogen-carbon dioxide separation module use membranes. Membranes separate molecules based on their relative permeability through various materials that may include polymers, metals, and metal oxides. The membranes are fed at elevated pressure. The permeate is collected at lower pressure while the retentate is collected at a pressure close to the feed pressure.

One embodiment of the membrane separation module, which may operate in conjunction with reactions at elevated temperature, utilizes a palladium membrane. The palladium membrane, which may be fabricated using palladium alone or in combination with modifiers, only allows hydrogen to permeate. This type of membrane, when operated in a catalytic reactor, such as in a reformer module, enhances yield by removing a reaction product from the reaction zone. Some variants of the palladium membrane are capable of operation at up to 900° C.

Another embodiment of the membrane separation module utilizes a high-temperature polymer membrane. This type of membrane is directed toward $CO_2$ separation and recovery. A polymeric-metal membrane of this type can operate at up to 370° C. (versus typical maximum polymer membrane temperatures of about 150° C.), thus potentially improving process energy efficiency by eliminating a pre-cooling step.

Another class of embodiments of the hydrogen-carbon dioxide separation module use pressure swing adsorption (PSA). PSA separates carbon dioxide by adsorption onto molecular sieves or hydrotalcite at elevated pressure. Hydrogen does not absorb and is therefore collected at high concentration at the outlet. A PSA module contains at least two sorbent columns so that while one is in absorption mode, the other one is in desorption mode. Reducing pressure and/or heating desorbs the carbon dioxide collected on the column. The PSA module may be designed to produce nearly pure hydrogen while collecting $CO_2$, CO, $CH_4$, and other gases in a separate stream.

Yet another class of embodiments of the hydrogen-carbon dioxide separation module use regenerable sorption beds. One example of a low-cost regenerable sorbent is sodium carbonate. The sodium carbonate sorbent absorbs at about 60° C. and regenerating at about 120° C.

Another example of a regenerable sorbent is detailed in U.S. Pat. No. 7,056,482 to Hakka et al. The regenerable sorbent includes at least one tertiary amine absorbent having a pKa for the amino function from about 6.5 to about 9 in the presence of an oxidation inhibitor to obtain a $CO_2$ rich stream. The $CO_2$ rich stream is treated to obtain the regenerated absorbent and a $CO_2$ rich product stream.

Another example of a regenerable sorbent is described in U.S. Pat. No. 7,067,456 to Fan et al. The reaction-based process described there selectively removes carbon dioxide from a multi-component gas mixture to provide a gaseous stream depleted in $CO_2$. Carbon dioxide is separated from a mixture of gases (such as driver gas) by its reaction with metal oxides (such as calcium oxide). This process includes contacting a $CO_2$ laden gas with calcium oxide (CaO) in a reactor such that CaO captures the $CO_2$ by the formation of calcium carbonate ($CaCO_3$). Once "spent," $CaCO_3$ is regenerated by its calcination, leading to the formation of fresh CaO sorbent and the evolution of a concentrated stream of $CO_2$. The "regenerated" CaO is then recycled for the further capture of more $CO_2$.

In general, processes that generate high $CO_2$ concentrations are more amenable to affordable gas separation. Elimination of diluents such as nitrogen from air improves $CO_2$ capture efficiency greatly. In addition, processes that produce $CO_2$ at elevated pressure are at an advantage for the pressure-based separation techniques.

Various gas separator modules may be used, and the present invention is not limited to the particular gas separators shown or described herein, so long as the gas separators perform at least the function of separating hydrogen from the rest of the driver gas.

Compressor and Injection Modules

In many oil wells, the driver gas must be compressed to high pressure before it may be injected into the oil well. This is due to the fact that the oil well may already be at a high pressure from methane and other gases in solution as well as previous driver gas injection. In addition, pressure generally increases with depth underground. The compressor module is used to compress the driver gas to a pressure appropriate for oil recovery. The compressor module is capable of compressing the $CO_2$ as well as a portion of the hydrogen intended for underground use to high pressure.

Various types of gas compressor modules may be used to compress the driver gas before injection into the oil well. Numerous types of compressors are available, but all are stand alone modules built for the flow, pressure, and temperature design parameters of the DGGS. These modules may be built to operate using electric motors to provide the proper rotation speed and power input. However, air-driven motors or internal combustion engines may also be used. Alternate drives such as mechanical linkage to the power generator module are also possible, as described below.

Compressors for $CO_2$, $H_2$, or a combination of these gases may be based on lubricated or non-lubricated rotary, centrifugal, or reciprocating designs. These types of compressors may use seals around the rotary or reciprocating shafts.

Another class of compressors that may be used to compress driver gas is based on metal diaphragms. These are available from different manufacturers for a wide range of flow rate and pressure requirements. This class of compressors is designed so that no lubricant or coolant comes in contact with the process gas. Only the metal diaphragm and elastomer seals contact the process gas.

The compressor may be effectively explosion proof. This can be accomplished by using an explosion-proof pump, or alternatively by housing a pump that is not rated explosion-proof within an air-tight container that provides an inert environment.

Designs of compressors may be found in U.S. Pat. No. 6,431,840 to Mashimo et al., U.S. Pat. No. 5,769,610 to Paul et al., U.S. Pat. No. 5,674,053 to Paul et al., and U.S. Pat. No. 5,033,940 to Baumann.

Various compressors are within the scope of the present invention, and are not limited to the designs and configurations illustrated and described here, so long as the compressors can compress the driver gas to a pressure appropriate for injection into the oil well.

The injection module is used to eject the driver gas from the DGGS into an injection line, while the injection line is used to send the driver gas deep into the oil well for use in oil extraction. The injection module may be a port, a hole, or interlocking mechanism for connecting the compressor module to the injection line. The injection line feeds the driver gas down the injection well. Various injection modules and injection lines are within the scope of the present invention, and are not limited to the specific designs and configurations illustrated and described here.

Power Generator Module

The hydrogen gas separated by the gas separator module may be used to generate power. The power may be used on-site to provide power to various sub-systems, or modules, or alternatively the power may be sold for additional revenue. The power generator module utilizes a portion of the hydrogen gas separated by the gas separator module to generate power. In one embodiment, the power generator module is used to generate electricity. In another embodiment, the power generator module is used to generate mechanical power for the compressor module. In one embodiment, the electricity is sold to a utility company by feeding the electricity into the electric grid. The power generator module may be a combustion turbine, a steam turbine, a fuel cell, or any other apparatus, system, or module that can generate power (electrical or mechanical or other) from hydrogen gas.

According to one embodiment of the power generator module utilizing a combustion turbine, hydrogen is fed with air to generate power through a rotating shaft. Designs of hydrogen gas turbine plants are described in U.S. Pat. No. 5,755,089 to Vanselow, U.S. Pat. No. 5,687,559 to Sato, and U.S. Pat. No. 5,590,518 to Janes. Designs of hydrogen internal combustion engines are described in U.S. Pat. No. 7,089,907 to Shinagawa et al., U.S. Pat. No. 4,508,064 to Watanabe, and U.S. Pat. No. 3,918,263 to Swingle.

Another embodiment of the power generator module uses a steam turbine. A variety of fuels may be used, including a portion of the separated hydrogen, part of the coal or other feedstock material, or even waste hydrocarbon gases. The fuel is burned in air in a combustion chamber to generate heat. The heat is transferred to a closed-loop steam/water system through a series of heat exchangers designed to recover the combustion heat. The high-pressure steam drives a turbine for power generation. In one embodiment, the combustion turbine and steam turbine may be integrated to boost efficiency.

The combustion and steam turbine shafts may be connected to generators to produce electrical power. However, they may also be used to produce mechanical power from the turbine shaft (for direct drive of the gas compressor module, for example).

As an alternative to combustion, in one embodiment of the present invention, a fuel cell module may be used to convert hydrogen directly to electricity, usually with greater efficiency albeit at a higher capital cost. The fuel cell module, an electrochemical energy conversion device, produces electricity from the hydrogen fuel (on the anode side) and oxidant (on the cathode side). The hydrogen and oxidant (which may be ambient oxygen) react in the presence of an electrolyte. The reactants (hydrogen and oxygen) flow in and reaction products (water) flow out, while the electrolyte remains in the cell. The fuel cell can operate virtually continuously as long as the necessary flows of hydrogen and oxidant are maintained. Designs of fuel cell plants are described in U.S. Pat. No. 6,893,755 to Leboe, U.S. Pat. No. 6,653,005 to Muradov, U.S. Pat. No. 6,503,649 to Czajkowski et al., U.S. Pat. No. 6,458,478 to Wang et al., U.S. Pat. No. 5,079,103 to Schramm, U.S. Pat. No. 4,659,634 to Struthers, and U.S. Pat. No. 4,622,275 to Noguchi et al.

Various power generator modules are within the scope of the present invention, and are not limited to the particular power generators shown or described here, so long as the power generators can generate power, whether electrical, mechanical, or other, from hydrogen gas.

Gas Capture Module

A gas capture module is used to re-capture a portion of the driver gas emerging with the oil and to recycle the driver gas back into the oil well. The gas capture module allows the $CO_2$ and hydrogen that is released from the oil emerging from the ground to be re-captured and sent via the compressor module and the injection module back underground for reuse. The gas capture module increases the overall efficiency of the oil recovery operation, because a portion of the generated driver gas is recycled and reused.

In one embodiment, a gas capture module is created by pumping the oil into a vessel with a certain amount of ullage space above the oil, and drawing suction on the ullage with another pump. This operation will lower the vapor pressure of carbon dioxide and hydrogen above the oil, allowing gases in solution to outgas so that they can be recycled back into the well.

Various gas capture modules are within the scope of the present invention, and the present invention is not limited to the particular gas capture modules or methods shown or described here, as long as the gas capture modules or methods are capable of capturing at least a portion of the driver gas emerging with the oil from the oil well.

The Chassis

A chassis is used to support and transport the other sub-systems, or modules. The chassis may be attached to an appropriate method of transportation, such as a truck, boat, or aircraft. The chassis, carrying the various modules, may be mounted or carried upon any number of different vehicles.

The chassis may have one or more wheels for surface transportation, or it may have no wheels and may rely on the wheels of the vehicle on which it is mounted. This configuration makes the system highly portable, and allows the DGGS to be easily transported to the location of any oil well, including off-shore and remote wells.

FIG. 9 illustrates an embodiment of the present invention 900 having a chassis 902 to support one or more modules. Chassis slots 904, 906, 908, 910, and 912 may be used to house a reformer module, a heat exchange module, a gas separator module, a power generator module, and/or a compressor module. The chassis may have one or more wheels 913 for surface transportation, or the chassis may rely on the wheels of the vehicle on which it is mounted. FIG. 9 shows that one or more interchangeable modules may be used in each of the chassis slots 904-912. For example, any of a number of reformer modules may be used in slot 904. A coal reformer module 914 and a methane reformer module 915 are shown for illustrative purposes only. A local oil reformer module, a methanol reformer module, or any other reformer module according to the present invention may be used in chassis slot 904. Any heat exchange module, such as heat exchanger 916, may be used in slot 906. Any gas separator module, such as membrane separator module 918 or sorption bed 920, may be used in slot 908. Any power generator module, such as gas turbine 922 or fuel cell 924, may be used in slot 910. Any compressor module, such as compressor 926, may be used in slot 912. Any gas injection module, such as injection port 928, may be attached to the compressor module 926. The gas injection module may be a port, a hole, or any interconnecting interface between the compressor module 926 and the injection line 932. Driver gas 930 exits the compressor module 926 via injection module 928 and is sent deep into an oil well via injection line 932.

The modules are placed on the chassis 902 and interconnected in the appropriate fashion. For example, the heat exchange module 916 is appropriately connected to the reformer module 914 (or 915). The gas separator module 918 (or 920) takes one feed from the reformer module 914 (or 915), and outputs at least two streams of gas, one stream of $H_2$ gas and another stream of $CO_2$ and other gases. The $H_2$ stream is fed to the power generator module 922 (or 924), while the $CO_2$ and other driver gases are fed to the compressor module 926. Thus, the gas separator module 918 (or 920), the power generator module 922 (or 924), and the compressor module 926 are appropriately interconnected. The injection module 928 and the injection line 932 are appropriately interconnected with the compressor module 926.

Some sample chassis designs for surface transportation are described in U.S. Pat. No. 3,614,153 to Tantlinger et al. and U.S. Pat. No. 3,374,010 to Crockett et al. Various chassis configurations are possible, and the present invention is not limited to the chassis configuration and design illustrated here. For example, a different chassis design and configuration may be used for a chassis designed to be carried by an airplane (not shown) and a different design yet may be used for a chassis designed to be carried by a boat (not shown).

The Driver Gas Generation System

The operation, inter-connection, and use of the various modules are described in detail throughout this disclosure. These modular components may be mixed and matched by an operator of the present invention in appropriate combinations based on local conditions and market prices. For example, if the oil site has a high power requirement, or the local cost of electricity is high, the $H_2$ gas may be separated from the $CO_2$ gas using a gas separator as described above, and the $H_2$ gas may be burned in a gas turbine to generate electricity. The electricity may be used on-site to provide power for the oil field, or sold to an electric distribution company to generate additional revenue by feeding the electricity into the electric grid. Therefore, a portable and modular system is provided for enhancing oil recovery and generating electricity wherever a candidate oil field may be, including off-shore and remote oil fields.

FIG. 10 illustrates one example of one embodiment 1000 of the present invention for extracting oil from an oil well and for generating electricity. This example is illustrative only, and is not intended to limit the scope of the present invention. A chassis 1002, having two wheels 1004 for surface transportation, supports five modules. The chassis slots are used to house a coal reformer 1006, a heat exchanger 1008, a membrane separator 1010, a gas turbine 1012, and a compressor 1014, respectively. An injection port 1016 is attached to the compressor 1014. Driver gas 1018 exits the compressor 1014 via the injection port 1016 and is sent via injection line 1020 deep into oil well 1022.

A control module 1024 is used to control the operation of each module 1006-1016 via bidirectional communication lines (shown as dashed lines). A gas capture module (not shown) may also be used to re-capture a portion of the driver gas that emerges with the oil from the oil well.

The modules are placed on the chassis 1002 and interconnected in the appropriate fashion. The coal reformer 1006 is connected to coal-water slurry pipe and oxygen pipe (shown as bold arrows) for receiving the reforming reaction fuel and water sources. The heat exchanger 1008 is appropriately connected to the coal reformer 1006. The membrane separator 1010 takes a feed from the coal reformer 1006 via heat exchanger 1008 and outputs at least two gas streams, one of $H_2$ gas and another of $CO_2$ and other gases. The $H_2$ stream is fed to the gas turbine 1012, while the $CO_2$ and other driver gases are fed to the compressor 1014 (shown as black arrows). Thus, the membrane separator 1010, the gas turbine 1012, and the compressor 1014 are appropriately interconnected. The injection line 1020 is appropriately connected to the compressor 1014 via injection port 1016; the injection line 1020 leads deep into the injection well 1022.

In addition, the gas turbine 1012 may be used to provide power to the membrane separator 1010, as well as the compressor 1014, via electrical or mechanical linkages (shown as white arrows). The gas turbine 1012 may also produce surplus electricity, which may be sold for additional revenue to a utility company by directly feeding electricity into the electric grid (shown as arrow 1026).

Figure 11:
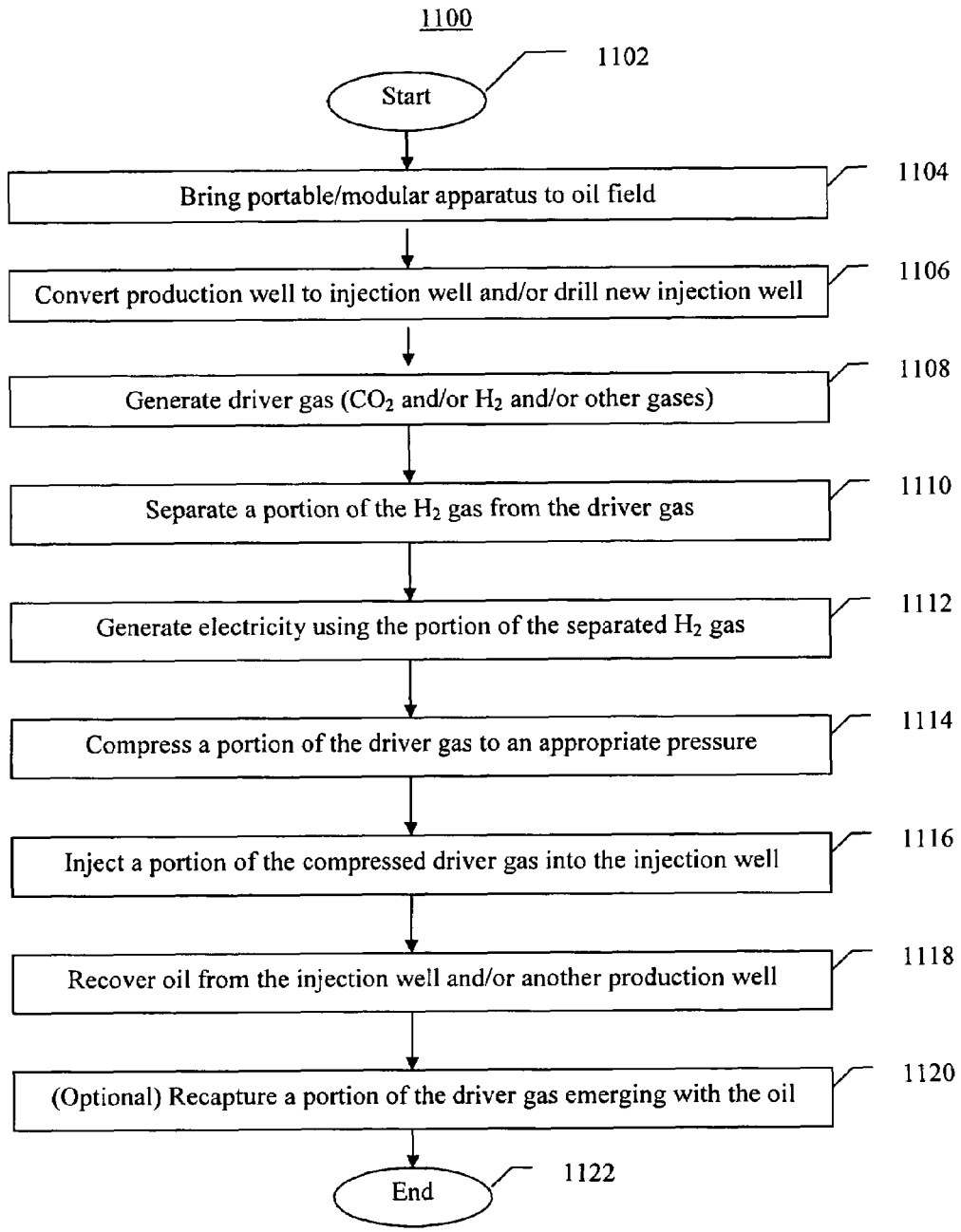
FIG. 11 illustrates an example of operations for extracting oil from an oil well and for generating electricity, in accordance with an embodiment of the present invention.

FIG. 11 illustrates an example of operations for extracting oil from an oil well and generating electricity, in accordance with the embodiment of FIG. 10. Process 1100 begins in step 1102. A portable/modular system/apparatus according to the present invention is brought to an oil field, as shown in step 1104. An existing production well is converted to an injection well and/or a new injection well is drilled, as shown in step 1106. Driver gas, comprising $CO_2$, $H_2$, and/or other gases is generated using the portable apparatus, as shown in step 1108. A portion of the $H_2$ gas is separated from the rest of the driver gas, as shown in step 1110. Using a portion of the separated $H_2$ gas, electricity is generated, as shown in step 1112. A portion of the driver gas intended for underground use is compressed to an appropriate pressure, as shown in step 1114. A portion of the compressed driver gas is injected into the injection well, as shown in step 1116. Oil is recovered from the same injection well ("Huff-and-Puff") and/or another production well, as shown in step 1118. Optionally, a portion of the driver gas emerging with the oil from the oil well is re-captured for reuse underground, as shown in step 1120. The process 1100 ends at step 1122.

Figure 12:
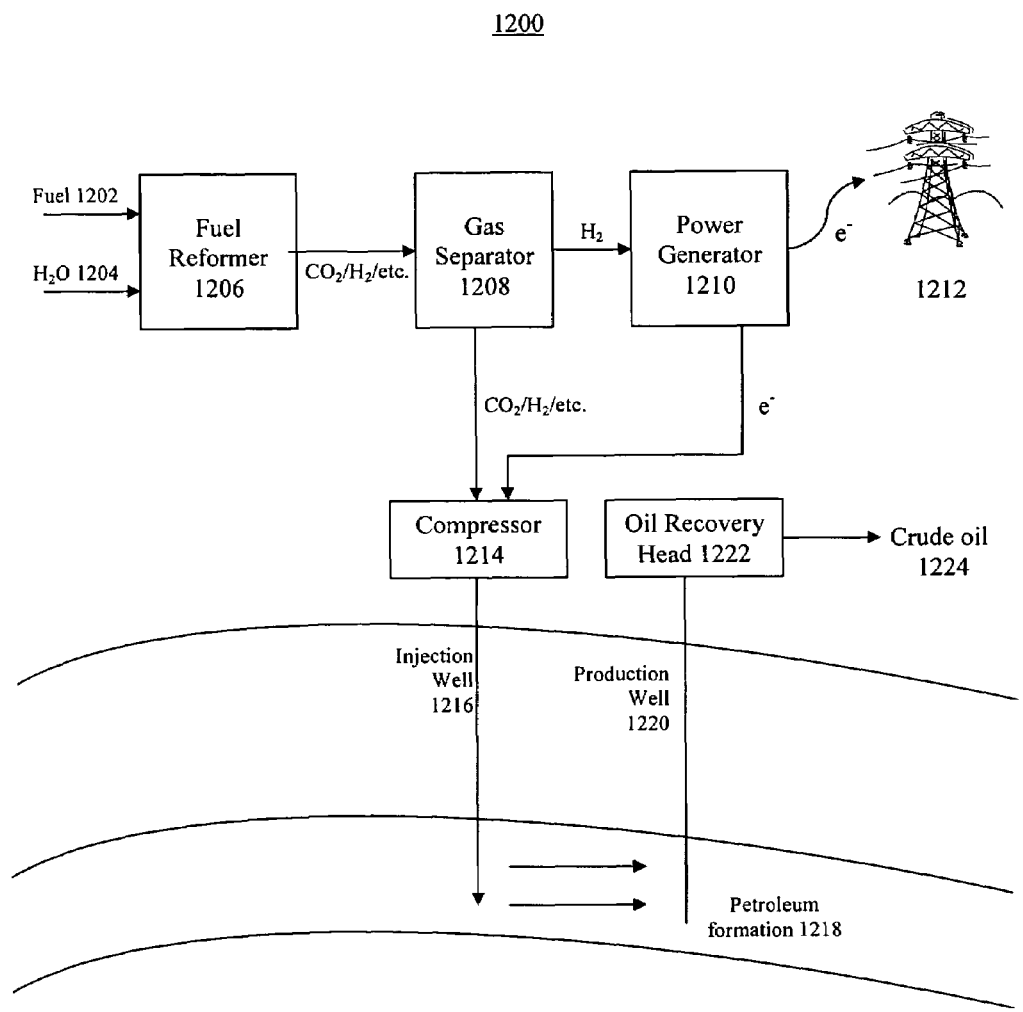
FIG. 12 illustrates another example of an embodiment of the present invention for the extraction of oil from an oil well and for the generation of electrical power.

FIG. 12 illustrates another example of an embodiment 1200 of the present invention for extracting oil from an oil well and for generating electricity. This example is illustrative only, and is not intended to limit the scope of the present invention. Fuel 1202 and water 1204 are fed into reformer module 1206. The fuel and water may also be pre-mixed and fed into reformer 1206 as a single stream. Oxygen, or another oxidizing agent, are fed into reformer 1206 via another line (not shown). Generated driver gas, which may include $CO_2$, $H_2$, as well as other gases, is fed into gas separator 1208, which separates a portion of the hydrogen gas from the other driver gases. A portion of the separated hydrogen gas is fed into power generator 1210, which could be a gas turbine, to generate electricity. A portion of the electricity is fed into the electric grid 1212. A portion of the electricity may also be used on-site, to provide power to various modules, such as the compressor 1214.

The rest of the driver gas is compressed by compressor 1214 for injection into injection well 1216. The driver gases, including the carbon dioxide as well as a portion of the hydrogen gas, and potentially other gases (such as $N_2$), pressurize the underground petroleum formation 1218 and reduce its viscosity. Crude oil 1224 is more amenable to recovery by oil recovery head 1222 via production well 1220, or other like site.

This is but one system configuration that is possible utilizing the modular components of the present invention, and the present invention is not limited to this particular configuration. For example, an operator who does not wish to generate electricity, and/or an operator who wishes to use all of the hydrogen gas along with the carbon dioxide gas for enhanced oil recovery, would not use a gas separator module or a power generator module, but would still use a reformer module and a compressor module. As another example, an operator who wishes to operate a hydrogenation plant near the oil well may chose to use a gas separator module to separate the hydrogen, but may chose not to use a power generator module. Such an operator would still use the other modules, and would feed the hydrogen gas to the hydrogenation plant.

That is, in one embodiment of the present invention, the hydrogen gas may be separated, and used separately from the carbon dioxide gas. For example, the hydrogen gas may be burned in a gas turbine, or sold to the petrochemical industry for crude oil refinery utilization (not illustrated), or to other parties for other purposes. In an alternative embodiment of the present invention, the hydrogen may be mixed with the carbon dioxide, and used in conjunction with the carbon dioxide for enhanced oil recovery.

Additionally, in one embodiment of the present invention, an operator is provided with multiple fuel reformer modules to choose from. The operator would select the appropriate reformer module based on local parameters and detailed economic modeling, as described in detail below. The DGGS may be designed so that the other modules do not need to be replaced when replacing one reformer module with another reformer module. The system may be designed to make all modules interchangeable and able to interface appropriately. Examples of the design of the reformer modules are provided above, and may include a methanol reformer, a coal reformer, a methane reformer, a local oil reformer, or any other type of reformer module using any other type of feedstock material. Two examples of reformer modules are illustrated in FIGS. 3 and 4. Various reformer modules are within the scope of the present invention, so long as the reformer modules generate driver gas from a fuel source. The discussion below in relation to FIGS. 15-17 discusses a parametric economic model that could be used for selecting an appropriate fuel reformer module.

The Control Module—Control Methods and Control Systems

A control module is used to control the operation of the DGGS both automatically and based on user-input. The control module may use subsurface data to automatically regulate the operation of the system via feedback control. This allows the DGGS to operate with minimal human supervision or labor. The control module also provides an interface for an operator to control, maintain, and supervise the operation of the DGGS.

The subsurface data used to control the DGGS may include total pressure, partial pressure of carbon dioxide, partial pressure of hydrogen, oil flow rate, gas flow rate, underground temperature, and/or viscosity of the oil. A pressure measurement probe leading down the injection line may measure the total underground pressure. Similarly, the underground partial pressure of the carbon dioxide gas and the partial pressure of the hydrogen gas may be measured by a carbon dioxide/hydrogen pressure probe leading down the injection line. The control module can control the system based on the total measured pressure, as well as the measured partial pressures of hydrogen and/or carbon dioxide gas.

The oil flow rate may be measured by a flow meter, and the control module may control the system based on the reading from the oil flow meter. Additionally, the driver gas flow rate may also be measured by a second flow meter attached to the injection module, and the control module may control the system based on the reading from the driver gas flow meter. The oil flow meter and the driver gas flow meter may also serve a secondary purpose of metering the amount of oil extracted and the amount of driver gas used for system maintenance, optimization, as well as billing purposes. For example, an operator of the system who leases the equipment may pay a leasing fee based on the amount of oil extracted or the amount of driver gas generated.

The control module may also measure the underground temperature of the oil using a temperature probe leading down the injection line, and control the system based on the measured underground temperature. A viscosity probe leading down the injection line may measure the viscosity of the underground oil, and the control module can control the system based on the measured underground viscosity of the oil. The control module may also use other subsurface parameters, or data taken from measurement probes, to automatically regulate the operation of the fuel reformer module, the injection module, and the other sub-systems (modules).

In one embodiment, a control method for controlling the DGGS includes the steps of measuring total pressure inside the oil well, and controlling the driver gas output from the DGGS based on the total pressure. The control method may increase the output from the reformer module when the measured pressure is below a predetermined threshold, and decrease the output from the reformer module when the measured pressure is above a predetermined threshold.

In another embodiment, a control method for controlling the DGGS includes the steps of measuring the partial pressure of hydrogen inside the oil well, and controlling the injection module based on the measured pressure. The control method may control the gas separator module to separate hydrogen gas from the driver gas, and control the injection module to output more hydrogen gas when the measured partial pressure of hydrogen is below a predetermined threshold, and to output less hydrogen gas when the measured partial pressure of hydrogen is above a predetermined threshold.

In yet another embodiment, a control method for controlling the DGGS includes the steps of measuring the partial pressure of carbon dioxide, and controlling the injection module based on the measured pressure. The control method may control the gas separator module to separate carbon dioxide gas from the driver gas, and control the injection module to output more carbon dioxide gas when the measured partial pressure of carbon dioxide is below a predetermined threshold, and to output less carbon dioxide gas when the measured partial pressure of carbon dioxide is above a predetermined threshold.

In yet another embodiment, a control method for controlling the DGGS includes the steps of measuring the viscosity of the oil, and controlling the injection module based on the measured viscosity. The control method may control the injection module to output more driver gas when the measured viscosity is below a predetermined threshold and to output less driver gas when the measured viscosity is above a predetermined threshold.

In yet another embodiment, a control method for controlling the DGGS includes the steps of measuring the flow rate of the oil, and controlling the injection module based on the measured oil flow rate. The control method may control the injection module to output more driver gas when the measured oil flow rate is below a predetermined threshold and to output less driver gas when the measured oil flow rate is above a predetermined threshold.

In yet another embodiment, a control method for controlling the DGGS includes the steps of measuring the gas flow rate of the driver gas, and controlling the injection module based on the measured gas flow rate. The control method may control the injection module to output more driver gas when the measured gas flow rate is below a predetermined threshold and to output less driver gas when the measured gas flow rate is above a predetermined threshold.

The above control methods may be implemented as a control system using negative feedback for controlling the DGGS to extract oil from an oil well in an optimal fashion. The control methods may be implemented in software, which may be stored on one or more computer-readable storage media. The computer-readable media may be used in a general-purpose computer to control the operation of the DGGS.

The control module may also be used to control the apparatus based on input from a human operator. The control module may include a set of controls, or a user interface running on an operating system, for user-driven control of the DGGS. The control module may be remotely operated, such as over the Internet or other network, in order to allow increased flexibility and remote surveillance and monitoring of the operation of the DGGS. An operator may remotely, automatically, and intelligently control the operation of several different DGGS units situated in several different oil wells (which may be situated at several different oil fields, which may be spaced hundreds or even thousands of kilometers apart) from a single control terminal located anywhere on the Internet.

For example, the human operator may use the control module to control the gas separator module and the power generator module based on the local price of electricity. That is, if the local price of electricity has increased and/or the oil site requires more power, the human operator may chose to divert more of the hydrogen to electricity generation rather than for use in oil recovery. The opposite condition may hold if the local price of electricity dropped or if the market price of oil rose; in this case the human operator may divert more of the hydrogen gas for enhanced oil recovery. (Alternatively, this optimization operation may be performed automatically by the control module based on inputs of the market prices and other parameters.) The human operator may also use the control module to turn the apparatus on or off and as well as perform other day-to-day operations and system maintenance.

Figure 13:
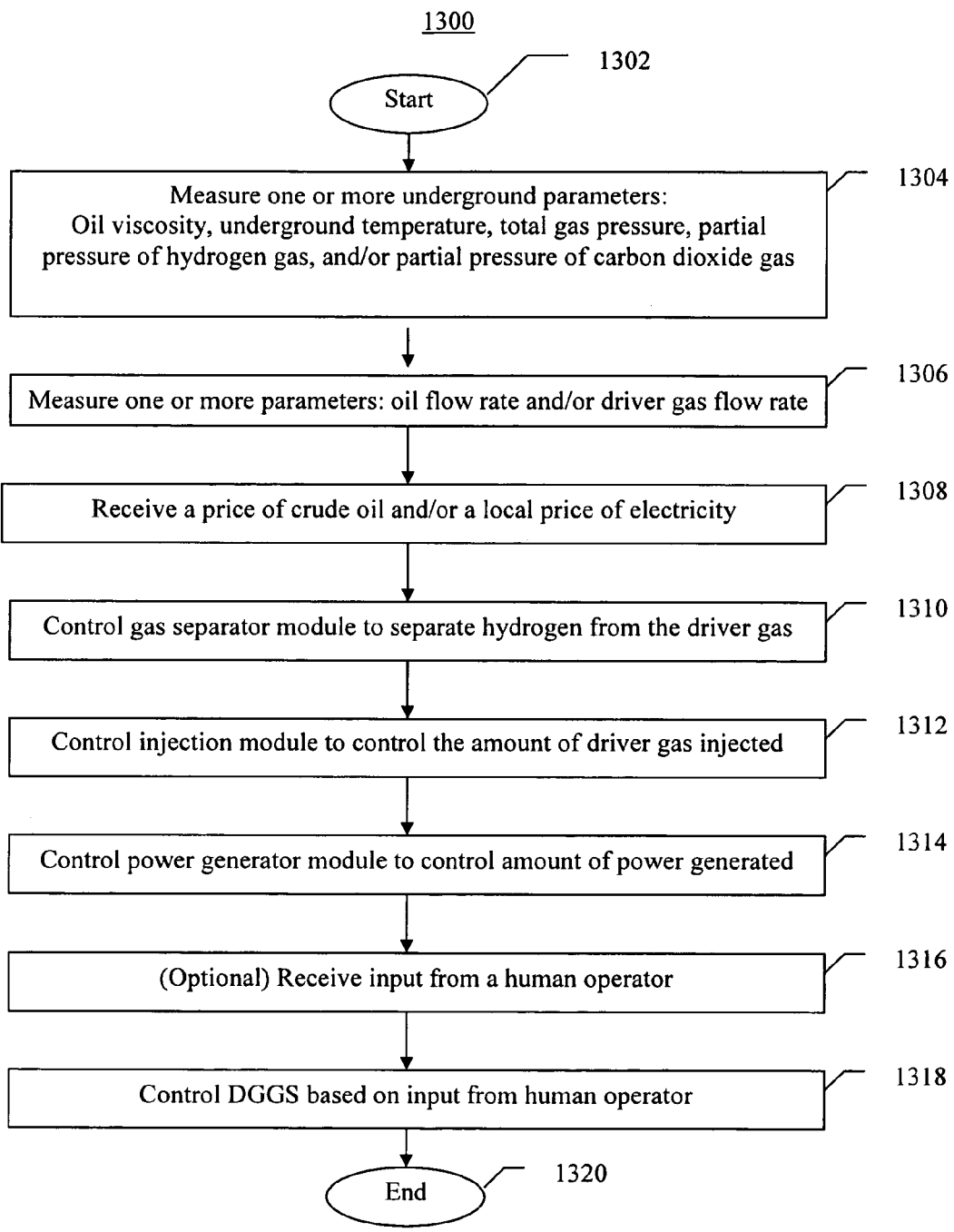
FIG. 13 shows a flowchart of a process for controlling a hybrid oil extractor/power generator apparatus according to one embodiment of the present invention.

One illustrative example of a process for controlling an apparatus for extracting oil from an oil well and for generating electricity is illustrated in FIG. 13. The process 1300 begins in step 1302. One or more underground parameters are measured, for example using appropriate measurement probes, as shown in step 1304. Oil viscosity, underground temperature, total gas pressure, partial pressure of hydrogen gas, and/or partial pressure of carbon dioxide gas may be measured in this step. One or more additional parameters are measured, such as the oil out-flow rate and/or the driver gas in-flow rate, as shown in step 1306. The price of crude oil and/or the price of electricity are received, for example from an online exchange, as shown in step 1308. The amount of hydrogen gas separated by the gas separator module is controlled based on the measured parameters and the received prices, as shown in step 1310. The amount of driver gas injected by the gas injection module is controlled based on the measured parameters and the received prices, as shown in step 1312. Finally, the amount of electricity generated by the power generator module is controlled based on the measured parameters and the received prices, as shown in step 1314. Optionally, input may be received from a human operator, via an appropriate input device, such as a keyboard or mouse, as shown in step 1316. Finally, the Driver Gas Generation System (DGGS) is controlled based on the input from the human operator, as shown in step 1318. The process 1300 ends in step 1320. This illustrative process is indicative of one of numerous control methods that are within the scope of the present invention.

Figure 14:
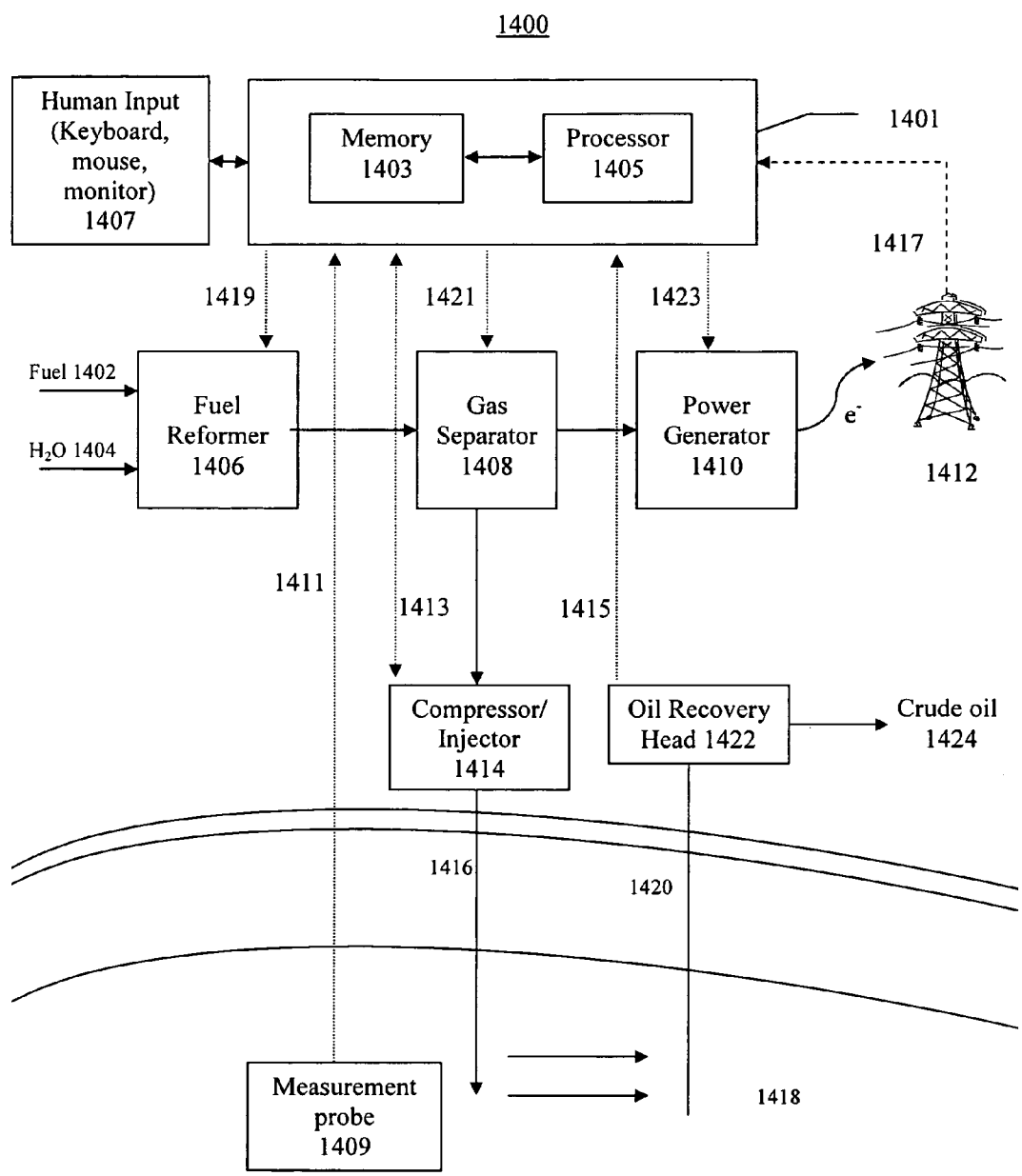
FIG. 14 shows a system diagram of a control system for controlling a hybrid oil extractor/power generator apparatus according to one embodiment of the present invention.

One illustrative example of a control system for controlling an apparatus for extracting oil from an oil well and for generating electricity is illustrated in FIG. 14. FIG. 14 is similar to FIG. 12, with control signals shown with dashed lines. Fuel 1402, water 1404, and oxygen (not shown) are fed into reformer module 1406. Generated driver gas is fed into gas separator 1408, which separates a portion of the hydrogen gas from the other driver gases. A portion of the separated hydrogen gas is fed into power generator 1410 to generate electricity, and a portion of the generated electricity is fed into the electric grid 1412. The rest of the driver gas is compressed by compressor 1414 and injected into injection well 1416. The driver gas pressurizes the underground petroleum formation 1418 and reduces its viscosity, and crude oil 1424 is recovered by oil recovery head 1422 via production well 1420.

Control module 1401, which includes memory 1403 and processor 1405, controls the operation of the entire system. The control module 1401 may receive input from a human operator, via human input module 1407, which could include a keyboard, a mouse, and a monitor. Other system components of the control module, which could be a general or a special purpose computer, are not shown for clarity. Measurement probe 1409, which could be a temperature probe, a viscosity probe, or a pressure probe, measures underground parameters, such as the temperature, the oil viscosity, the total pressure, and the partial pressures of carbon dioxide and hydrogen gas. Data from measurement probe 1409 may be communicated to the control module 1401 via line 1411. Gas in-flow rate may be communicated to the control module 1401 via line 1413 from a gas flow meter (not shown) connected to the output of the compressor/injector 1414. Oil out-flow rate as well as the viscosity of the emerging oil may be communicated to control module 1401 via line 1415 from an oil flow meter (not shown) connected to the output of the oil recovery head 1422. Finally, the price of electricity may be communicated to control module 1401 via line 1417 from the utility company. The control module 1401 may control the fuel reformer 1406 via line 1419, control the compressor/injector 1414 via line 1413, control the gas separator 1408 via line 1421, and control the power generator 1410 via line 1423. This illustrative example is merely indicative of one of numerous configurations of the control system according to the present invention, and is not intended to limit the scope of the present invention.

Various control modules and control methods are within the scope of the present invention, and the present invention is not limited to the particular control modules or control methods shown or described here. In addition, parameters other than the ones described here may be used to automatically control the DGGS, and all such parameters are within the scope of the present invention. The following discussion describes the scale and economics of operation of the Driver Gas Generation System (DGGS).

Scale of Operations

The scale of the present invention is simultaneously portable and also sized to generate sufficient driver gas for economic recovery of oil. For example, consider a near-depleted oil well that presently generates 1 barrel of oil per day. Established industry guidelines estimate 1 additional barrel of oil recovered for every 5,000 to 10,000 standard cubic feet (5-10 kcf) of $CO_2$ injected into a near-depleted oil well. (A value of 10 kcf of $CO_2$ per barrel of oil recovered will be used hereafter as a conservative estimate.) Therefore, in order to bring the capacity of the near-depleted oil well up from 1 Ba/day to 100 Ba/day, the present invention should be sized to generate approximately 1,000,000 standard cubic feet (1,000 kcf) of $CO_2$ per day. That is, in one embodiment of the present invention used for enhanced oil recovery in an oil field producing 100 barrels per day, an embodiment of the present invention would be sized to produce an output of $CO_2$ gas on the order of one million cubic feet per day (1 MMcf/day).

However, the present invention is by no means limited to an apparatus that produces $CO_2$ at a rate of 1 MMcf/day. For example, if an oil well is expected to produce 10 Ba/day, an embodiment of the present invention may be sized to produce an amount of $CO_2$ equal to approximately 100,000 standard cubic feet (100 kcf) per day. Alternatively, if an oil field is expected to produce 1,000 Ba/day, an embodiment of the present invention may be sized to produce an amount of $CO_2$ equal to approximately 10 million standard cubic feet (10 MMcf) per day. Since the volume of the reaction chamber, and hence the volume of $CO_2$ produced, grows as the cube of the linear dimension of the reaction chamber, an apparatus that produces 10 times the amount of $CO_2$ would have a linear footprint increase of approximately 2.2 times (cube-root of 10). That is, an apparatus sized to produce 10 MMcf/day of $CO_2$ would only be sized about two times larger in each linear dimension than an apparatus designed to produce 1 MMcf/day of $CO_2$.

Alternatively, an operator of an oil field may chose to utilize two or more smaller reformer modules in place of a larger reformer module. For example, consider an operator of an oil field described above producing 100 Ba/day. Such an operator needs approximately 1 million cubic feet of $CO_2$ per day (1 MMcf/day). Instead of utilizing one large fuel reformer module, an operator may chose to utilize four smaller fuel reformer modules, each sized to produce 250,000 cubic feet of $CO_2$ per day (250 kcf/day). One potential advantage of utilizing four smaller reformer modules over one large reformer module is the ability to space the four reformer modules easily around a single well. Another potential advantage of utilizing multiple smaller reformer modules over one large reformer module is the greater flexibility in transportation of the smaller reformer modules. Finally, another potential advantage of utilizing multiple smaller reformer modules is the standardization and economies of scale that are possible in manufacturing a reformer module of standardized size which is replicated for larger operations.

Therefore, based on the above analysis, it is apparent that an apparatus according to the present invention may be produced/manufactured for any appropriate oil well and/or oil field size at only a small incremental increase in production/manufacturing cost. Therefore, the present invention is a highly economical, highly portable, and highly modular apparatus that may be customized to an oil well and/or oil field of any size.

As shown below, the amount of hydrogen produced by reforming sufficient coal to produce 1 MMcf/day of carbon dioxide gas is also sufficient to produce about 2 Megawatts (MW) of electric power. This is a convenient size to feed meaningful amounts of electricity into an electric power grid to support growth of demand faced by power companies in a modular fashion, without the need for massive investment in new large scale (~1000 MW) facilities. Thus, the mass production and deployment of fuel reformer modules according to the present invention could be potentially very attractive for power companies, allowing them to meet their customer's demand of increased supply, without the risk of major investment in large facilities, while receiving their power from a continuously-available, carbon-emission-free source. This is in contrast to supplementing utility power with wind turbines or solar cells, whose power, while also carbon-emission-free, is only available on an irregular, or intermittent, basis.

Various alternative sizes may also be attractive. Therefore, the present invention may be sized appropriately, and any mention of particular sizes in this description is illustratively of but a few particular embodiments of the present invention, and is not meant to limit the scope of the present application to any particular size described.

Sample Reformer System Design Calculations

Process embodiments of the present invention can take place as a reforming reaction temperature between approximately 200° C. and approximately 500° C., with better results at higher temperatures, depending on the fuel source and catalyst. As such, the reforming feed, i.e., fuel and water sources, are heated to boiling temperature, vaporized, then continued to be heated to the above temperature range, where they react to form driver gas. After the reforming reaction, the gas product can be cooled. The heat is provided by combustion of a fuel or via a non-combustible source.

With regard to using a combustible reaction to supply the energy to drive the reforming reaction, a spark plug, incandescent wire, or any other ignition device is typically used to initiate the reaction.

The following description is provided as an illustrative example and is not meant to limit the description herein. Use of methanol will be provided for illustrative purposes.

Step 1: Preheat Reformer Feed, Cooling of Gas

The reformer feed (methanol and water) enters the system at 20° C. The average boiling temperature for the $CH_3OH$ and $H_2O$ is approximately 90° C. Assuming as an example a small system with a driver gas production rate of 100 standard liters per minute, the heat required to preheat the reformer feed from 20° C. to 90° C. is 202 J/s. The heat lost during this step is 4 J/s. The aim of this heat exchanger is to have the gas exit at about 35° C. Knowing the preheat will require a total of 206 J/s, the inlet temperature of the hydrogen-rich gas needed is calculated to be 130° C. A heat exchanger model shows that a total length of 2.6 m of tube-in-tube exchanger is needed. When coiled, the resulting height is about 9 cm.

Step 2: Begin Boiling Reformer Feed, Begin Cooling Gas

The hydrogen-rich gas will be leaving the reaction chamber at about 400° C. As it cools to 130° C., a heat of 613 J/s is produced, 16.5 J/s of which is lost. To vaporize the $CH_3OH$ and $H_2O$, 1308 J/s is needed. Therefore, the gas partially boils the reformer feed. The total length of the tube-in-tube required for this process is 2.1 m. When coiled, the resulting height is about 7 cm. The heat exchangers for Steps 1 and 2 may be combined into a single unit.

Step 3: Finish Boiling Reformer Feed, Cool the Combustion Gas

After Step 2, the reforming feed still needs 710 J/s to finish vaporizing, and in this step, 42 J/s is lost. As calculated in Step 5, the combustion gas will leave the reformer at about 648° C. Giving the reforming feed the heat it needs to boil brings the combustion gas temperature down to 127° C. This takes a length of 2.8 m of the tube-in-tube exchanger, which is about 10 cm high when coiled.

Step 4: Finish Heating Reformer Feed

The reforming feed is already vaporized and will finish heating when it contacts the top plate of a combustion chamber. Heating the reforming feed from 90° C. to 400° C. requires 518 J/s. This amount of heat brings the temperature of the combustion gas from 1650° C. to 1360° C.

Step 5: Reforming Reaction

To reform $CH_3OH$ and $H_2O$, 1080 J/s of power may be used in this example. This section of the heat exchanger also loses 94 J/s to the surroundings. Accommodating this, the combustion gas temperature drops from 1360° C. to 648° C. The design length of this multiple tube section is about 20 cm.

An equation for determining the heat used or needed for these processes is $Q=\Sigma mC_p \Delta T$. The calculations lead to obtaining the $\Delta H$ and heat lost across a given section and the section's length. The heat exchange formulas and calculation methods used for the reformer system design are given in Incropera and DeWitt (1996).

Economics of Driver Gas Production

The processes of the present invention produce significant quantities of hydrogen and $CO_2$. While the yield from $CO_2$ Enhanced Oil Recovery (EOR) techniques varies depending upon the reservoir in question, it is generally taken in the industry that where conditions are appropriate for the technique, yields of about 1 barrel of oil per 5,000 to 10,000 standard cubic feet (5-10 kcf) of gaseous $CO_2$ can be expected. (For a conservative estimate, the following discussion will assume 1 barrel of oil recovered per 10 kcf $CO_2$ injected.) For this reason, $CO_2$-EOR is generally viewed as a viable method to use under conditions where $CO_2$ can be obtained at a cost of $2/kcf or less (e.g., the cost of $CO_2$ is less than approximately $20/bbl of oil recovered). Unfortunately, currently $CO_2$ supplies are only available at such costs if the oil field in question is situated a comparatively short distance from either natural $CO_2$ reservoirs or large scale artificial $CO_2$ sources such as coal-fired power plants, ethanol plants, or steel mills. This situation leaves most oil fields that could otherwise be good candidates for $CO_2$-EOR stranded out of reach of effective economic recovery.

As recognized by the present inventors, the present invention is a modular, highly portable apparatus/system that may be taken to wherever the oil site may be. Therefore, the present invention provides $CO_2$ at an economic cost at the oil site. As an example demonstrating the potential economic utility of the present invention, consider the case of a coal-fired unit, whose owner-operator decides to use all of the $CO_2$ product for EOR, while directing all of the hydrogen for another use, for example, power generation. In this example, the owner-operator has decided to utilize a solid hydrocarbon, such as coal, for the reforming reaction as well as the combustion reaction because, for example, the coal is readily and cheaply available, as is often the case at oil sites.

The reforming reaction for coal is shown in Reaction 15:

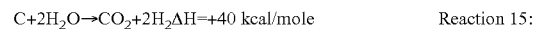

This reaction is endothermic, but can be driven by the exothermic burning of coal as shown in Reaction 16:

Accordingly, four units of Reaction 16 can drive nine units of Reaction 15, leaving:

So, in the nearly energy-neutral Reaction (17), 156 kg of C produce 13 kmoles (10.6 kcf) of $CO_2$ and 18 kmoles (14.7 kcf) of hydrogen.

A typical price for coal is $30/tonne, or $0.03/kg. At this price, the 156 kg of C would cost about $4.68. But since this is producing 10.6 kcf of $CO_2$, the cost in feedstock per kcf of $CO_2$ produced comes out to $0.44/kcf, well below the approximately $2/kcf industry benchmark for economic $CO_2$-EOR.

However, in addition, the system according to the present invention also generates 18 kmoles (14.7 kcf) of hydrogen. The hydrogen may be used with the carbon dioxide in enhanced oil recovery as described above. Alternatively, the hydrogen may be separated from the carbon dioxide using a gas separator module as noted above and burned to produce power.

Assume the hydrogen gas is burned in a gas turbine to produce power, in accordance with Reaction 18:

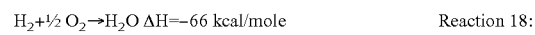

Reaction 17 produces 18 kmoles of hydrogen, which translates to 1,188,000 kcal=4,989,600 kJ=1386 kWe-hr of energy. Assuming a thermal-to-electrical conversion efficiency of 33%, this transforms to 462 kWe-hr. At a typical electricity price of $0.10/kWe, this amount of power is worth $46.20. (kWe=kilowatt; kWe-hr=kilowatt hours.)

Therefore, by using the present invention, an operator transformed $4.68 worth of coal into $46.20 worth of electricity plus an amount of $CO_2$ worth $21.20 at the standard EOR acceptable rate of $2/kcf, and which can be used to recover 1.06 barrels of oil, worth $63.60 at a typical expected oil price of $60/bbl. Taken together, the value of the electricity plus that of the recovered oil amount to $109.80, or about 23.5 times the $4.68 worth of coal consumed in the process.

It should be noted that this is a worst-case scenario for the operation of the present invention, because by being burned for electricity, the 18 kmoles of hydrogen yield a lower monetary return than the 13 moles of $CO_2$. If the hydrogen can be used with equal effectiveness as $CO_2$ as a means of driving oil out of the ground as described above, instead of producing $46.20 worth of electricity, the hydrogen would yield $88.06 worth of oil, for a total return of $151.66, or 32.4 times the value of the coal consumed.

Of course, the operator of the present invention will have other costs besides coal, including capital equipment, labor, taxes, insurance, etc., but as shown by the analysis below, provided these and other normal business matters are handled effectively, the potential for profit from such a system could be quite large.

Profit would be enhanced further if some of the $CO_2$ and/or $H_2$ used to recover oil can be recaptured and recycled after the oil is brought to the surface. Effective use of such techniques would make many fuels much more expensive than coal highly attractive for utilization in the present invention. Also note that in the above example, power is being produced with less emission of $CO_2$ to the atmosphere. As a result of widespread concern over global warming, proposals are being considered to create taxes on $CO_2$ emissions, with typical figures mentioned in the range of $50/tonne $CO_2$ released into the atmosphere. This is equivalent to a tax on coal of $14/tonne, roughly 47% the cost of typical coal. The present invention would allow coal to be burned to produce power without incurring such tax penalties.

Considering the figures from the above example, if 156 kg/day of coal produces 10.6 kcf of $CO_2$ and 14.7 kcf of hydrogen, then 14,716 kg of coal per day will be needed to supply 1 MMcf of $CO_2$, as well as 1.39 MMcf of hydrogen (MMcf=million cubic feet).

Assuming an oil yield of 1 barrel/10 kcf of $CO_2$, such an operation could be expected to recover 100 barrels/day, for a cash value at $60/bbl of $6,000. The hydrogen will yield 43,585 kWe-hr of electricity, for a total sales value at $0.10/kWe-hr of $4,358/day, and an output power level of 1,816 kWe. At $30/tonne, the cost of the coal to feed the apparatus of the present invention will be just $441/day. (kWe=kilowatt; kWe-hr=kilowatt hours)

Thus, the total gross income generated by the system of the present invention would be $10,358/day, or about $3.8 million per year. The coal costs will be about $160,000 per year. Assuming a payroll of $400,000/year for a five-man operating crew, plus $200,000 per year to make interest and principal payments on a total plant and equipment valued at $2 million, plus another $240,000 per year to cover other costs, a total overhead budget of $1 million/year is obtained. Therefore, net profit from system operations according to the principles of the present invention would be about $2.8 million per year.

The above economic analyses show that both hydrogen and carbon dioxide generated from coal according to the principles of the present invention may be profitably used to extract oil from underground or underwater sources, such as depleted oil wells. As described below, similar calculations may be used to show that various other fuel sources for the reforming reaction and the combustion reaction may be profitably used to extract oil from depleted oil wells. Similar calculations may also be used to show that the principles of the present invention may be used to extract natural gas from underground or underwater sources, such as depleted natural gas reservoirs.

According to one embodiment of the present invention, pressurized hydrogen and $CO_2$ are injected simultaneously into the oil well. Carbon dioxide, when combined with hydrogen, will have a greater impact on enhanced oil recovery than $CO_2$ or $H_2$ alone. Carbon dioxide, by virtue of dissolving in the crude oil, will decrease the viscosity of the oil, making it more readily extractable. By permeating the small nooks and crevices in the bedrock, the hydrogen will have greater access to the oil and further reduce its viscosity. Thus, carbon dioxide and hydrogen will have a cooperative and mutually beneficial effect on the oil recovery process. However, it will be appreciated that this invention is not limited to this particular theory of operation.

Parametric Economic Analysis: Choosing Between Reformer Modules

A parametric economic model was designed to assist an operator in selecting an appropriate fuel reformer. Certain assumptions are input into the model (for example, cost of raw materials and capital/operating expenses). The model may be used to select among alternative fuel sources, reformer modules, and among other appropriate modules for the DGGS.

A sample economic analysis was performed to determine the profitability of using the DGGS for enhanced oil recovery in a particular oil field under particular market conditions. The results indicate that the operation of the DGGS system is profitable in this particular scenario if the system feeds are coal, natural gas, propane, or local oil. The profits are directly proportional to the efficacy of $H_2$ relative to $CO_2$ at recovering oil and inversely proportional to the cost of the feedstock.

Several assumptions were made about the unit size, the feedstock materials, and the capital and operating expenses when utilizing the present invention in this particular hypothetical scenario. An assumption was made on the unit size of the reformer modules. The calculations were based on a modular system, with each reformer module producing 250 kcf (thousand cubic feet) of $CO_2$ per day of operations. Two scenarios were calculated, one in which a single 250 kcf/day reformer module is used (FIG. 13) and one in which four such reformer modules are used at a single oil site to produce a gross of 1 MMcf/day (FIG. 14).

The feedstocks included in this analysis were coal, local oil, natural gas, propane, and methanol. For calculation purposes, natural gas was assumed to be equivalent to methane and local oil was assumed to have properties similar to n-decane. The prices and properties of the reforming and combustion reactions are tabulated in Table 2. The price includes a $14 delivery charge to the site. This includes 500 miles by rail at 1.4 ¢/ton-mile and 50 miles by truck at 14 ¢/ton-mile (1 ton=2200 lbs.) based on data obtained from the United States Department of Energy (DOE). Coal was assumed to have an average cost of $44 per ton (a very conservative estimate), local oil was assumed to have an average value of $60/barrel, methane (natural gas) was assumed to have an average cost of $6.60/kcf, methanol was assumed to have an average cost of $1.65/gallon, and propane was assumed to have an average cost of $1.00/gallon. All pricing data was acquired from the U.S. Department of Energy.

Table 2 summarizes the input parameters. Of course, an operator of the present invention would adjust these input parameters to fit the appropriate conditions of the oil well that the operator was considering.

TABLE 2

Cost, energy content, and $CO_2$ and $H_2$ production quantities of various fuels

| | | Reforming per ton fuel | | | Combustion per ton fuel | |
|---|---|---|---|---|---|---|
| | Price | energy | | | | |
| | $/ton | (kJ) | cf $CO_2$ | cf $H_2$ | energy (kJ) | Cf $CO_2$ |
| Coal | 44.00 | 14.8E+06 | 70,666 | 141,332 | −32.8E+06 | 70,666 |
| Local oil | 469.00 | 14.5E+06 | 58,889 | 182,556 | −43.6E+06 | 69,444 |
| Methane | 350.00 | 15.4E+06 | 53,000 | 212,000 | −50.1E+06 | 62,500 |
| Methanol | 565.00 | 2.0E+06 | 26,500 | 53,000 | −19.9E+06 | 26,500 |

TABLE 2-continued

Cost, energy content, and $CO_2$ and $H_2$ production quantities of various fuels

| | | Reforming per ton fuel | | | Combustion per ton fuel | |
|---|---|---|---|---|---|---|
| | Price | energy | | | | |
| | $/ton | (kJ) | cf $CO_2$ | cf $H_2$ | energy (kJ) | Cf $CO_2$ |
| Propane | 544.00 | 8.4E+06 | 57,818 | 192,727 | −46.4E+06 | 57,818 |

The capital and operating expenses were based on four scenarios depending on the feedstock and whether the $H_2$ is injected for oil recovery or separated for electricity production.

It was assumed that the use of coal would require an additional $500,000 in capital expenses for the additional processing steps associated with the coal reformer modules described above. Furthermore, if the $H_2$ is separated and converted into electricity, it was assumed that there would be an additional $500,000 increase in capital expenses for the gas separator and power generator modules described above. The capital expenses were amortized over a period of 10 years.

The operating expenses were assumed to be slightly higher if coal is used as the feedstock material considering the ancillary equipment associated with the coal reformer modules described above. The capital expenses and operating expenses are summarized in Table 3.

TABLE 3

Capital and operating expenses for various scenarios

| | Feed-stock | $H_2$ injected | $H_2$ separated | Comment |
|---|---|---|---|---|
| Capital Expenses | Coal | $1,500,000 | $2,000,000 | amortized over 10 years |
| Capital Expenses | Other | $1,000,000 | $1,500,000 | amortized over 10 years |
| Operating Expenses | Coal | $300,000 | $450,000 | per year |
| Operating Expenses | Other | $200,000 | $300,000 | per year |

It was also assumed that each 10 kcf of $CO_2$ injected would lead to 1 bbl of oil recovered. It was also assumed that hydrogen could be converted to electricity with 33% efficiency and that the electricity could be sold for 10 ¢ per kWe-hr ($0.10/kWh, based on data from the U.S. Department of Energy). It should also be noted that the $CO_2$ produced from the combustion reaction was assumed to be separated from the flue gas and injected into the well for oil recovery.

Using the assumptions above, a cost of operating a 250 kcf/day reformer module with different operating parameters was calculated. The performance was calculated with different combinations of fuels for the reforming reaction and the combustion reaction; whether the hydrogen was injected into the well or separated for electricity production; and with different efficacies of hydrogen at oil recovery relative to $CO_2$. The results of this analysis are shown in FIG. 15 for a single day of operation at a $CO_2$ output of 250 kcf/day from the reformer module. Similarly, results were obtained for an oil field operating four such reformer modules simultaneously to produce 1,000 kcf $CO_2$ in a single day of operation, as shown in FIG. 16. (Note that the financial multiples improve with the use of four reformer modules.)

Utilizing the calculated results, financial multipliers may be determined as a function of the effectiveness of hydrogen at oil recovery relative to $CO_2$. This function is shown for different fuels in FIG. 17. It is clear that the profits increase with the effectiveness of hydrogen relative to $CO_2$ for all reformer fuels. Notably, even if the hydrogen does not aid in oil recovery, using coal, methane, or local oil is still profitable with financial multipliers ranging from 1.2 for local oil to 2.2 for coal.

Figure 17:
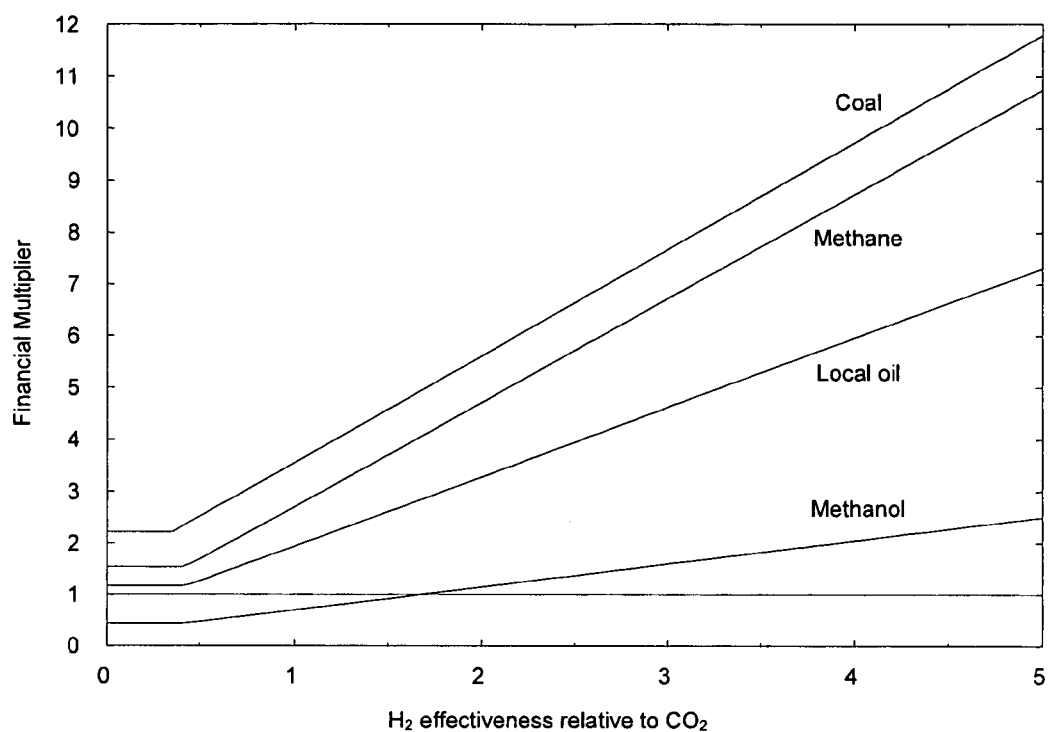
FIG. 17 illustrates a parametric economic model comparing financial multipliers for various feedstock materials as a function of the hydrogen effectiveness relative to carbon dioxide effectiveness in enhancing oil recovery.

The results of FIGS. 15-17 indicate that the financial returns are impressive, especially when a cheap fuel such as coal is used and hydrogen is at least as effective as $CO_2$ at oil recovery ($4 to $6 return on each dollar invested).

Preliminary laboratory test results, which measured only short-term effects of hydrogen (that is, its physical, not its chemical effects), show hydrogen to be 25% as effective, on a molecule-for-molecule basis, as $CO_2$ in reducing oil viscosity. This is a significant finding, because as shown by Reactions 3-9, significantly more hydrogen is produced on a molar basis than carbon dioxide. If four times as much hydrogen is produced as carbon dioxide from steam reforming, and hydrogen is 25% as effective as $CO_2$, then the total amount of hydrogen is as effective as the $CO_2$ in enhanced oil recovery, and the additional hydrogen increases the efficiency of $CO_2$-EOR by two-fold. Further, the preliminary test results did not take into account the long-term chemical effects of hydrogen-petroleum interaction (such as in-situ hydrogenation, for example), nor the potential cooperative effects of hydrogen and carbon dioxide.

Thus it may be seen that carbon dioxide and hydrogen, working alone or in combination, have unique properties that can be applied to the problems of improved recovery of crude oil.

Furthermore, it is anticipated that the demand for DGGS systems according to the present invention would be quite large considering the untapped oil resources that are available all over the world. $CO_2$ Enhanced Oil Recovery (EOR) is usually only applied in those wells where there is an abundant $CO_2$ supply nearby. This is certainly not the case in, for example, the states of Kansas or Pennsylvania in the U.S., where there are hundreds of millions of barrels of oil available that are currently out of reach because there is no local source of $CO_2$, according to the U.S. Department of Energy.

The U.S. Department of Energy estimates that the usage of $CO_2$ for EOR has the potential to expand the domestic oil supply by 89 billion barrels of oil (a resource worth $5.3 trillion at current prices). Even if the DGGS according to the present invention is implemented to recover only a small fraction of these resources, the return will be staggering.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A control method for controlling an apparatus designed to extract oil from a production well by injecting driver gas into an injection well, the control method comprising the steps of:

measuring a viscosity and a flow rate of the oil at the production well and one or more parameters inside the production well;

controlling an amount of driver gas generated by the apparatus based on the measurements by controlling a reformer module of the apparatus, the reformer module adapted to reform a fuel source, transported to a site of the production well, and water; and controlling an amount of driver gas injected by the apparatus at the injection well based on the measurements by controlling an injection module of the apparatus.

2. The method of claim 1, wherein the one or more parameters includes at least total underground pressure; and wherein the method further comprises:

increasing the output from the apparatus when the measured pressure is below a predetermined threshold; and decreasing the output from the apparatus when the measured pressure is above a predetermined threshold.

3. The method of claim 1, wherein the one or more parameters includes at least subsurface partial pressure of hydrogen.

4. The method of claim 3, wherein the apparatus also includes a gas separator module; and wherein the method further comprises:

controlling the gas separator module to separate hydrogen gas from the driver gas; and controlling the injection module to inject more hydrogen gas into Earth's subsurface when the measured subsurface partial pressure of hydrogen is below a predetermined threshold; and controlling the injection module to inject less hydrogen gas into the oil well when the measured subsurface partial pressure of hydrogen is above a predetermined threshold.

5. The method of claim 1, wherein the one or more parameters includes at least subsurface partial pressure of carbon dioxide and subsurface partial pressure of hydrogen gas.

6. The method of claim 5, further comprising:

controlling the gas separator module to separate hydrogen gas from the driver gas;

controlling the injection module to inject more carbon dioxide gas into the oil well when the measured subsurface partial pressure of carbon dioxide is below a predetermined threshold; and controlling the injection module to output less carbon dioxide gas when the measured subsurface partial pressure of carbon dioxide is above a predetermined threshold.

7. The method of claim 1, wherein the method further comprises:

controlling the injection module to output more driver gas when the measured viscosity is above a predetermined threshold; and controlling the injection module to output less driver gas when the measured viscosity is below a predetermined threshold.

8. The method of claim 1, wherein the one or more parameters includes at least partial pressure of carbon dioxide; and wherein the method further comprises:

controlling the injection module to inject more carbon dioxide gas into the oil well when the measured partial pressure of carbon dioxide is below a predetermined threshold.

9. The control method of claim 1, wherein the apparatus also includes a power generator module; and wherein the control method further comprising:

increasing a power output of the power generator module when a market price of electricity relative to a market price of crude petroleum increases; and decreasing the power output of the power generator module when the market price of electricity relative to the market price of crude petroleum decreases.

10. The control method of claim 1, further comprising:

increasing a driver gas output when a market price of crude petroleum increases relative to a market price of electricity; and decreasing a driver gas output when the market price of crude petroleum relative to the market price of electricity decreases.

11. A control system for controlling an apparatus designed to extract oil from a production well by injecting driver gas into an injection well, the control system comprising:

one or more memories; and one or more processors, operatively coupled to the one or more memories, the processors adapted to execute program code stored in the one or more memories in order to execute a process to:

measure a viscosity and a flow rate of the oil at the production well and one or more parameters inside the production well;

control an amount of driver gas generated by the apparatus based on the measurements by controlling a reformer module of the apparatus, the reformer module adapted to reform a fuel source, transported to a site of the production well, and water; and control an amount of driver gas injected by the apparatus based on the measurements by controlling an injection module of the apparatus.

12. The control system of claim 11, wherein the one or more parameters includes at least total underground pressure; and wherein the one or more memories of the control system comprises program code to execute a process to:

increase the output from the apparatus when the total underground pressure is below a predetermined threshold; and decrease the output from the apparatus when the total underground pressure is above a predetermined threshold.

13. The control system of claim 11, wherein the apparatus also includes a gas separator module;

wherein the one or more parameters includes at least subsurface partial pressure of hydrogen; and wherein the one or more memories of the control system comprises program code to execute a process to:

control the gas separator module to separate hydrogen gas from the driver gas;

control the injection module to inject more hydrogen gas into the oil well when the measured subsurface partial pressure of hydrogen is below a predetermined threshold; and control the injection module to inject less hydrogen gas into the oil well when the measured subsurface partial pressure of hydrogen is above a predetermined threshold.

14. The control system of claim 11,
wherein the one or more parameters includes at least subsurface partial pressure of carbon dioxide gas and subsurface partial pressure of hydrogen gas; and
wherein the one or more memories of the control system comprises program code to execute a process to:
control the gas separator module to separate hydrogen gas from carbon dioxide gas in the driver gas;
control the injection module to inject more carbon dioxide gas into the oil well when the measured subsurface partial pressure of carbon dioxide is below a predetermined threshold; and
control the injection module to output less carbon dioxide gas when the measured subsurface partial pressure of carbon dioxide is above a predetermined threshold.

15. The control system of claim 11,
wherein the one or more memories of the control system comprises program code to execute a process to:
control the injection module to output more driver gas when the measured viscosity is above a predetermined threshold; and
control the injection module to output less driver gas when the measured viscosity is below a predetermined threshold.

16. The control system of claim 11, wherein the one or more parameters includes at least partial pressure of carbon dioxide; and
wherein the one or more memories of the control system comprises program code to execute a process to:
control the injection module to inject more carbon dioxide gas into the oil well when the measured partial pressure of carbon dioxide is below a predetermined threshold.

17. The control system of claim 11, wherein the apparatus also includes a power generator module, and wherein the one or more memories of the control system further comprise program code to execute a process to:
increase a power output of the power generator module when a market price of electricity relative to a market price of crude petroleum increases; and
decrease a power output of the power generator module when the market price of electricity relative to the market price of crude petroleum decreases.

18. The control system of claim 11, wherein the one or more memories further comprise program code to execute a process to:
increase a driver gas output when a market price of crude petroleum relative to a market price of electricity increases; and
decrease a driver gas output when the market price of crude petroleum relative to the market price of electricity decreases.

* * * * *